US012480049B2

(12) United States Patent
Vashchenko et al.

(10) Patent No.: US 12,480,049 B2
(45) Date of Patent: Nov. 25, 2025

(54) COMPOUND AND LIQUID CRYSTAL COMPOSITION

(71) Applicant: The Hong Kong University of Science and Technology, Hong Kong (CN)

(72) Inventors: Valerii Vladimirovich Vashchenko, Hong Kong (CN); Olena V. Vashchenko, Hong Kong (CN); Abhishek Kumar Srivastava, Hong Kong (CN); Zhibo Sun, Hong Kong (CN); Zhengnan Yuan, Hong Kong (CN); Hoi Sing Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 26 days.

(21) Appl. No.: 18/165,361

(22) Filed: Feb. 7, 2023

(65) Prior Publication Data

US 2023/0250338 A1 Aug. 10, 2023

Related U.S. Application Data

(60) Provisional application No. 63/307,611, filed on Feb. 7, 2022.

(51) Int. Cl.
*C09K 19/02* (2006.01)
*C09K 19/12* (2006.01)
(Continued)

(52) U.S. Cl.
CPC .......... *C09K 19/0225* (2013.01); *C09K 19/12* (2013.01); *C09K 19/322* (2013.01);
(Continued)

(58) Field of Classification Search
None
See application file for complete search history.

(56) References Cited

FOREIGN PATENT DOCUMENTS

| | | | |
|---|---|---|---|
| EP | 0293763 | A2 | 6/1987 |
| EP | 0339414 | B1 | 4/1988 |

(Continued)

OTHER PUBLICATIONS

Machine Translation of EP 0339414 A2 (Year: 2024).*

(Continued)

*Primary Examiner* — Chanceity N Robinson
(74) *Attorney, Agent, or Firm* — S&F/WEHRW

(57) ABSTRACT

A ferroelectric liquid crystal (FLC) material for the deformed helix FLC (DHFLC) electro-optical mode devices and shows optimum electro-optical properties including high tilt angle (>38°), and short helix pitch (<120 nm), and spontaneous polarization (>100 nC/cm$^2$) comprising at least two components, wherein at least one FLC component is a chiral compound of Formula (I):

(I)

particularly:

(Continued)

-continued

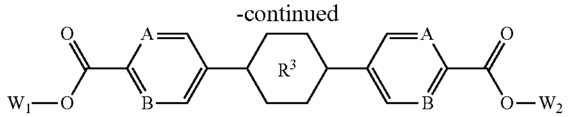

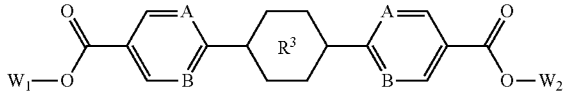

wherein $W_1$ and $W_2$ are chiral groups with polar substituent at chiral centre, A and B are independently N atom or CH groups providing that at least one of A or B is N atom. Other various groups are as defined herein.

17 Claims, 8 Drawing Sheets

(51) Int. Cl.
*C09K 19/32* (2006.01)
*C09K 19/34* (2006.01)

(52) U.S. Cl.
CPC ........ *C09K 19/3444* (2013.01); *C09K 19/345* (2013.01); *C09K 2019/122* (2013.01); *C09K 2019/123* (2013.01); *C09K 2019/323* (2013.01)

(56) References Cited

FOREIGN PATENT DOCUMENTS

| | | | | |
|---|---|---|---|---|
| EP | 0347941 | A2 | | 6/1988 |
| EP | 0309774 | A2 | | 4/1989 |
| EP | 0339414 | A2 | * | 11/1989 |
| EP | 0546298 | A2 | | 6/1993 |
| EP | 0814368 | A2 | | 6/1996 |
| JP | 0517409 | A | | 1/1993 |
| JP | 05213827 | A | | 8/1993 |
| RU | 2092883 | C1 | * | 10/1997 |

OTHER PUBLICATIONS

RU-2092883-C1 Machine Translation (Year: 2024).*

Sven T. Lagerwall, "Ferroelectric Liquid Crystal Displays and Devices", in Handbook of Liquid Crystals: 8 Volume Set, Second Edition. Edited by J. W. Goodby, P.J. Collings, T. Kato, C. Tschierske, H. F. Gleeson, and P. Raynes, 2014 Wiley-VCH Verlag Gmbh & Co. KGaA. Published 2014 by Wiley-VCH Verlag GmbH & Co. KGaA., vol. 8. Applications of Liquid Crystals, Part I. Display Devices, pp. 1-25.

Coe-Sullivan, S., SID Symposium Digest of Technical Papers, Wiley Online Library 2016, pp. 239-240.

Gardiner, D.J., Morris, S.M., Castles, F., Qasim, M.M., Kim, W.S., Choi, S.S., Park, H.J., Chung, I.J., Coles, H.J. (2011). Applied Physics Letters, 98, 263508.

Lagerwall, S.T. (2004). Ferroelectric and antiferroelectric liquid crystals. Ferroelectrics, 301, 15.

Xu, S., Ren, H., Wu, S.T. (2012). Optics Express, 20, 28518.

Ming, Y., Chen, P. et al. (2017). Tailoring the photon spin via light-matter interaction in liquid-crystal-based twisting structures. Quantum Materials, 2(1), 6.

Okaichi, N., Kawakita, M., Sasaki, H., Watanabe, H., Mishina, T. (2018). "High-quality direct-view display combining multiple integral 3D images" Journal of the Society for Information Display, 1-12, 2018.

A.K. Srivastava, V.G. Chigrinov, H.S. Kwok, Ferroelectric liquid crystals: Excellent tool for modern displays and photonics, J. Soc. Inform. Display 23 (2015) 253-272.

J.W. Goodby, Ferroelectric liquid crystals. Principles, properties and applications, Gordon and Breach Science Publishers S.A., 1991. заменить на более свежую , LC Handbook 2014.

M.Hird, Ferroelectricity in liquid crystals—Materials, properties and applications, Liq. Cryst., 38 (2011) 1467-1493.

M.Hird, Designing principles, synthesis, and properties of smectic C host materials for ferroelectric liquid crystals, in J. W. Goodby, P.J. Collings, T. Kato, C. Tschierske, H.F. Gleeson, P. Raynes (Eds.): Handbook of liquid crystals, second ed., Wiley-VCH, New York, 2014, pp. 237-261.

Ingo Dierking, Michel Mitov and Mikhail A. Osipov, Smectic layer instabilities in liquid crystals, Soft Matter, 2015, 11, 819.

D. W. Berreman, Twisted Smectic C Phase: Unique Optical Properties, Mol. Cryst. Liq. Cryst. 22 (1973) 175-184.

K. Hori, Angular dependence of selective reflection from the chiral smectic C phase, Mol. Cryst. Liq. Cryst. 82 (1982) 13-17.

Levstik, Z. Kutnjak, C. Filipic, I. Levstik, Z. Bregar, B. Zeks, T. Carlsson, Dielectric method for determining the rotational viscosity in thick samples of ferroelectric chiral smectic-C* liquid crystals, Phys. Rev. A 42 (1990) 2204-2210.

L. M. Blinov, Electro-Optical and Magneto-Optical Properties of Liquid Crystals, John Wiley & Sons Ltd., Chichester, 1983.

E. P. Pozhidaev, M. A. Osipov, V. G. Chigrinov, V. A. Baikalov, L. M. Blinov, L. A. Beresnev., ZhETPH (sov), 94, pp. 125-132 (1988).

Beresnev, L.A., Chigrinov, V.G., Dergachev, D.I., Pozhidaev, E.P., Funfschilling, J., Schadt, M. Deformed helix ferroelectric liquid crystal display: A new electrooptic mode in ferroelectric chiral smectic C liquid crystals, Liquid Crystals, 1989, 5, 1171-1177.

J. Fünfschilling and M. Schadt, Fast responding and highly multiplexible distorted helix ferroelectric liquid crystal displays, J. Appl. Phys. 66, 3877 (1989).

L.A. Beresnev, W. Haase, A.P. Onokhov, W. Dultz, M.V. Isaev, N.A. Feoktistov, N.L. Ivanova, E.A. Konshina, A.N. Chaika, V.A. Berenberg, T. Weyrauch, Deformed helix ferroelectric liquid crystals with large tilt angles in optically addressed spatial light modulators for dynamical holography applications, Mat. Res. Soc. Symp. Proc., 1998, vol. 488, 859-865.

L. A. Beresnev , L. M. Blinov , S. Grobmann , Kanchan Saxena & W. Haase (1997) Landau expansion coefficients related to second oder SmA-SmC* transition for ferroelectric liquid crystal mixtures composed from achiral matrix and chiral dopants, Ferroelectrics, 200:1, 51-63.

L. Beresnev, A. Biradar, W. Dultz, S. Pikin & W. Haase (1997): Low Voltage Very Fast Electroclinic Materials. New Molecular Approach, Molecular Crystals and Liquid Crystals Science and Technology. Section A. Molecular Crystals and Liquid Crystals, 299:1, 525-539.

V. Mikhailenko, A. Krivoshey, E. Pozhidaev, E. Popova, A. Fedoryako, S. Gamzaeva, V. Barbashov, A.K. Srivastava, H.S. Kwok, V. Vashchenko, The nano-scale pitch ferroelectric liquid crystal materials for modern display and photonic application employing highly effective chiral components: trifluoro-methylalkyl diesters of p-terphenyl-dicarboxylic acid, J. Mol. Liq. 281 (2019) 186-195.

Przemysław Kula , Jakub Herman & Olga Chojnowska (2013) Synthesis and properties of terphenyl- and quaterphenyl-based chiral diesters, Liquid Crystals, 40:1, 83-90.

Madimir S. Bezborodov, Valery I. Lapanik, Genadz M. Sasnouski & Wolfgang Haase (2013) The synthesis and properties of some chiral mesomorphic quaterphenyl and cyclohexylterphenyl derivatives and the FLC compositions based upon them, Liquid Crystals, 40:10, 1383-1390.

G.W. Gray, M. Hird, D. Lacey, K.J. Toyne, Journal of the Chemical Society, Perkin Transactions 2 (1989) 2041-2053.

* cited by examiner

COMPOUND AND LIQUID CRYSTAL COMPOSITION

REFERENCES TO RELATED APPLICATION(S)

This application claims priority to United States provisional utility patent application No. 63/307,611 filed with the United States Patent and Trademark Office on Feb. 7, 2022, the disclosure of which is hereby incorporated by reference.

TECHNICAL FIELD

The present disclosure generally relates to a ferroelectric liquid crystal (FLC) material for the deformed helix FLC (DHFLC) electro-optical mode devices.

BACKGROUND ART

Recent trends in the display and photonic industries demand for high-speed electro-optical modulation of light in the form of amplitude, phase, or both, of the impinging light [1-7]. Fast electro-optical amplitude modulation is highly desirable for the efficient field sequential color displays, augmented reality/virtual reality headset, 3D cinema etc. whereas, the fast phase modulation is required for the holographic displays, photonics, telecommunications, and optical switches. Fast phase modulation is also important for field sequential color displays, with its ability to reduce power consumption by at least 3 times [1, 3, 5]. It is important for these high-resolution devices to have a fast response time while exhibiting a small driving voltage [8, 9]. Although nematic liquid crystals are widely used as a working media for display and photonic applications, considering the current demand for fast switching, their capability is limited by their sub-millisecond response time. In this respect, the ferroelectric liquid crystals (FLCs) are a great alternative. The presence of spontaneous polarization reveals fast response time even at smaller driving voltages, because of which, FLCs have been explored heavily [1, 4].

FLCs are chiral tilted smectic LC (SmC*) comprising molecules arranged in layers (smectic layers) where they are tilted in one direction at a particular angle within the layer (tilt angle θ). The tilted molecules from layer to layer form an induced supramolecule helix, which axis is perpendicular to the interlayers boundary. The distance taken by said tilted molecules in a layer to make a full turn is termed the helix pitch ($p_0$), which can be of two signs. Each said layer has a dipole moment, which is oriented perpendicularly to a tilted plane (the plane defined by long axis of a molecule and its projection onto the interlayer boundary); due to chirality, the $P_S$ can also be of two signs. Enantiomers (full mirror isomers of chiral molecules) are induced the said $p_0$ and $P_S$ of opposite signs. Enantiomers of different chemical formula can have any of four combinations of $p_0$ and $P_S$, which depends on the particular chemical structure of the taken chiral molecules. When two or more different chiral compounds are used in an FLC, the said $1/p_0$ and $P_S$ are following, in the first approximation, to an additive law, i.e. they are summarized proportionally to their concentrations and signs. The said helix can be unwound by some external factors, like external electric field, or interaction with boundary surface, or combination thereof, etc.

The electro-optical operations of FLCs can be classified into two basic types, namely with or without helix. Surface stabilized FLC (SSFLC) and bi-stable FLC are electro-optical modulations without helix, where the helix is suppressed either by interaction with boundary surface or compensated by using chiral components with opposite signs of twisting ($1/p_0$). The said helix suppression is easier to reach when the $p_0 >> d$ (where d is cell gap). On the other hand, the electro-optical (EO) modulations with helix can be further divided into two subcategories: (a) when the helix always exists during the whole electro-optical operation as in the case of deformed helix ferroelectric LC (DHFLC) in planar alignment or Kerr effect (DHFLC in vertically aligned conditions), and (b) where the helix exists in the absence of an electric field and unwinds in the presence of a sufficiently large electric field as in the case of electrically suppressed helix in FLC (ESHFLC). In order to get the said EO effects, the $p_0$ should be $<<d$ in the case of DHFLC and $p_0 \approx d$ in the case of ESHFLC.

Although, SSFLC effect is the most popular and widely studied, the SSFLC displays did not become commercially profitable products because of several fundamental problems, particularly due to poor alignment issues. In contrast, DHFLC, having less alignment issues, has the potential to combine all-in-one advantages of LC working medium for a display application with its fast response time, analog gray scale capability and IPS excellent viewing angle. The performance of electrooptical properties, such as image quality, brightness, light transmittance, contrast ratio, switching time, range of variation of grayscale, are interlinked in a complex manner with macroscopic parameters of FLC (spontaneous polarization, helix pitch, tilt angle, critical voltage of helix unwinding, etc.), which in turn depend on the molecular structure of constituent components of the FLC.

The high performance of DHFLC can only be achieved when all of the said macroscopic parameters will in the optimal ranges of their values. Below the importance of each of said macroscopic parameters and their allowed variation are given and defined. For instance, some studies have shown that the helix pitch, p0 value is important for DHFLC performance and its value is a result of trade-off for several reasons:

(i) in order to satisfy the prerequisite of DHF existence in the typically used cell gap of 1.5-3 μm thicknesses, the $p_0$ should be well below 200 nm, (ii) the pitch should be short enough to shift the Bragg diffraction of helical supramolecular structure into UV region in order to secure the high contrast; the Bragg diffraction in the FLC phase is not observed at any angle when p0 value is less than 120 nm [10].

(iii) the helix pitch in a DHFLC material, from another hand, should not be extremely tight due to increase of the critical electric field of the helix unwinding ($E_c$) over available voltage of ~5V provided by thin film transistors (TFT).

The parameter $E_c$, however, should not also be too smaller than its value provided by TFT and electrical driving scheme, because the DHF effect in LCs is observed when applied electric field $E<E_c$, and within the range the transmittance is almost linearly depends on E allowing to realize a continuous and hysteresis-free gray scale. Therefore, overtighten of the $p_0$ results to high $E_c$ thereby affect the gray scale range.

Other studies have suggested that to obtain a maximum transmittance the optimal value of tilt angle (θ) should be 450 at half-wave conditions, i.e. birefringence $\Delta n=\lambda/2d$ [1, 8, 9]. However, the θ can be reduced to 39-40° at acceptable low loss of transmittance. In addition, some studies have shown that spontaneous polarization $P_S$ has effect on $E_c$ and switching time. As it was also found, the optimal range for spontaneous polarization $P_S$ to be within 80-180 nC/cm$^2$.

Although existing technologies and studies done have attempted to overcome this issue, the parameters provided in the studies are far from practical applications as we are demonstrating in analysis of prior arts below.

EP0309774A2 describes FLC display cell, which was based on DHFLC effect. In a distorted helix ferroelectric liquid crystal display cell, the ratio of the thickness (d) of the liquid crystal layer to the helical pitch of FLC is >5, the smectic tilt angle was 22.5°-50°, and the product $d(\theta)^2\Delta n$ $(1/\lambda)$ (phase factor, where $\Delta n$ was the birefringence and $\lambda$ was the wavelength of the light) is >0.45 rad$^2$. The cell may contain a mixture of pyrimidine derivatives and a diester of terphenyldicarboxylic acid. The ratio of cell gap to helix pitch d/p0>10 was specified. The tilt angle used was 29°. Example of the FLC mixture provided the said parameters was specified as:

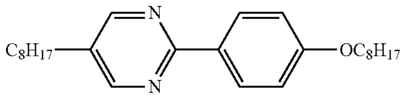

26.1 wt. %

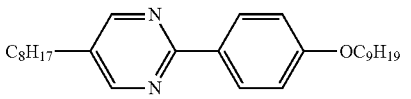

17.1 wt. %

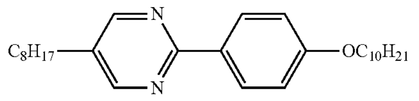

24.5 wt. %

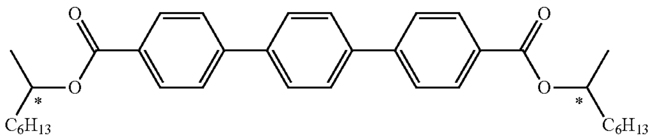

32.3 wt. %

In EP0309774A2, the general formula of the chiral component was the following, where $R_1$ and $R_2$ are alkyls, which are independent from one another:

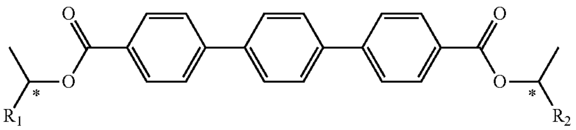

In EP0309774A2, the range of tilt angle (θ) was pointed out to be 22.5°-50°. However, any example supporting this range of θ variation was not provided neither in following claims nor in the patent specification. Maximum achievable value of θ for with the chiral components in the said prior art, is 30°, see also the prior art below Beresnev et. al., Liquid Crystals, 1989, 5, 1171-1177.

Beresnev et. al., Liquid Crystals, 1989, 5, 1171-1177 describes new electrooptical effect in SmC* liquid crystals, which was called the deformed helical ferroelectric (DHF) effect. DHF effect was based on the deformation of the helical structure by weak electric fields. In the unbiased device, the smectic layers were arranged in the bookshelf geometry with the helix axis parallel to the electrodes. Systems with a very small pitch (<1 pm) and a large tilt angle are especially well suited for this mode. The key characteristics of DHF-LCDs are: (a) low driving fields (1 V/μm for maximum contrast); (b) grey scale which is approximately linear with the applied electric field; (c) easy alignment even for thick cells using standard wall-aligning methods; and (d) response times at room temperature of 300 ps. The parameters of the mixtures where the DHF effect was found are:

Ferroelectric liquid crystals for the DHF-LCD mode.

| Parameter | Mixture A | Mixture B |
|---|---|---|
| Helix pitch, $P_0$/μm at 25° C. | 0.3-0.4 | 0.3-0.35 |
| Tilt angle, Θ6/° at 25° C. | 29 | 30 |
| Working temperature range/° C. | 8-54 | 2-50.5 |
| Polarization, $P_s/10^{-8}$ C cm$^{-2}$ | 7 | 8 |
| Unwinding voltage, $U_u$/V | 2 ± 0.1 | 3 ± 0.1 |
| Layer thickness, L/μm | 3.3 ± 0.1 | 10 ± 0.2 |
| Effective birefringence, Δn | 0.10 | 0.11 |
| Response time/μs | | |
| at U = 1.5 V | 150-200 | |
| at U = 2 V | | 500 |

The chiral additives (chiral component) that was used is named LUCh-15, which was derivative of terphenyldicarboxylic acid. However, exact chemical structures of both chiral additives and achiral SmC liquid crystal hosts were not disclosed. According to Beresnev et. al., Molecular Crystals and Liquid Crystals, 299:1, 525-539 it can be supposed, the LUCh-15 is:

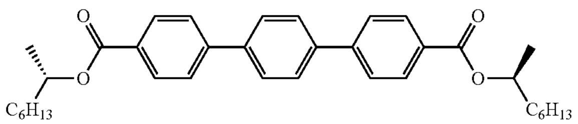

The parameters reported in Beresnev et. al, Liquid Crystals, 1989, 5, 1171-1177 (θ=29-30°, helix pitch p0=0.3-0.4 μm, $P_S$ etc) are found to be far from required for practical application.

EP0339414A2 describes the optically active diester compounds having the general formula I, wherein A, B, C=unsubstituted or halogen-, CN-, Me-, or MeO-substituted 1,4-phenylene in which 1 or 2 $CH_2$ groups may be replaced by N; R*=the radical of an optically active terpene alc. after splitting off the OH or $(CH_2)_mCHXR^*$; or $(CH_2)_nCHX_2R^*$.

(I)

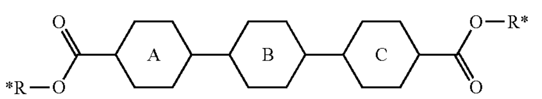

and

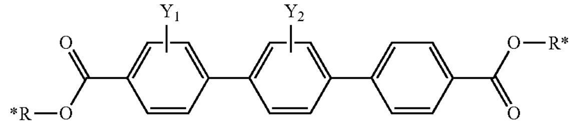

Claim 1 of the prior art EP0339414A2 restricted variation of rings A, B and C so that no more than one of them is pyrimidin-2,5-diyl or pyrydin-2,5-diyl, or all of them are 1,4-penylene ring, where $Y_1$ and $Y_2$ are independently one another H or halogen, provided that at least one of $Y_1$ and $Y_2$ is different from hydrogen when R' and R' both are 2-alkyl. This prior art spontaneous polarization was measured at 40° C. for 5% mixture of chiral component with phenyl-benzoate type SmC host. Spontaneous polarization varies from 0.51 to 20 nC/cm$^2$. The host shows melting point well above room temperature as individually as with mixed CC, which is inappropriate for practical use. Any other data on these materials' performance (p0, θ, switching time) are not described.

Fünfschilling et. al., J. Appl. Phys. 66, 3877 (1989) describes findings on the electro-optics and the display performance of liquid-crystal devices based on the distorted helix ferroelectric (DHF) effect which demonstrate TV switching rates and low driving voltages. The DHF effect is based on S*c ferroelectric liquid crystals with very short pitch, which form in suitable cells a bookshelf arrangement of the smectic layers with a helical axis parallel to the plane of the display. The distortion of this helix by an applied electric field is responsible for the electro-optical effect. If the pitch is shorter than the wavelength, the distortion leads to a change of the effective refractive index.

However, unwinding of the helix is one of the limitations of these devices. It was shown that standard cell preparation techniques and driving schemes-including active matrix addressing—minimize helix unwinding and lead to highly multiplexable displays with short response times in the 10-μs region. Black-white contrast ratios>12:1 at driving voltages<2 V and grey scales was also reported.

Fünfschilling et. al., J. Appl. Phys. 66, 3877 (1989) is similar to Beresnev et. al, Liquid Crystals, 1989, 5, 1171-1177 except in the FLC materials used. In Fünfschilling et. al., J. Appl. Phys. 66, 3877 (1989), experiments have been done with the ferroelectric mixture FLC 5679 of Hoffmann-LaRoche, Basel. FLC 5679 which exhibited the following properties:

temperature of phase transitions (° C.): Cr −5, SmC* 60, SmA 62–Iso, spontaneous polarization $P_S$=100 nC/cm$^2$, helix pitch $p_0$=0.35 μm, and tilt angle θ=38°

It is noted, the FLC in DHF cell shows much smaller number of defects, than that in the cell for SSFLC effect. The advantage is that the tilt angle (θ) is high enough to provide 94% of theoretical transmittance, allowing for spontaneous polarization of Ps=100 nC/cm$^2$. On the other hand, the temperature dependence θ(T) is not described, the SmC* range is also narrow, helix pitch was also not tight enough, the diffraction in blue range was observed reducing together with defect alignment with a contrast ratio of 12:1.

Beresnev et. al, Mat. Res. Soc. Symp. Proc., 1998, Vol. 488, 859-865 describes the development of optically addressed spatial light modulators (OASLMs) based on deformed helix ferroelectric liquid crystals (DHFLC) with high tilt angles on order of 40° and helical pitches less than 0.2 μm. The diffraction efficiency reached the order of 20%. The light induced deviation of the optical axis of the DHFLC layer was measured in sandwich structures consisting of photoconductors and liquid crystals. The photoelectric parameters of photoconductive amorphous silicon carbide α-SiC:H and photoconductive polymeric films were measured with and without light blocking and reflecting layers. The application of the developed OASLMs in a holographic image corrector was demonstrated.

Parameters of DHFLC materials are as follows.

| | FLC material | | | |
|---|---|---|---|---|
| Parameter | FLC-459 | FLC-461 | FLC-464 | FLC-471 |
| Interval of SmC* phase, 'C | -10 ... +65 | 0 ... 63.5 | +5 ... +62 | +2 ... +62.5 |
| Tilt angle, ° (25° C.) | 41.0 | 41.5 | 40.0 | 39.5 |
| Spontaneous polarization, nC/cm$^2$ | 18 | 93 | 120 | 115 |
| Pitch of helix μm (25° C.) | 0.35 | 0.22 | 0.18 | 0.19 |

Beresnev et. al, Mat. Res. Soc. Symp. Proc., 1998, Vol. 488, 859-865 demonstrated high tilt angle and spontaneous polarization. However, the compositions of the materials and $V_c$ were not reported and only known that the chiral component is individual or mixture of diesters of terphenyl-dicarboxylic acid. Furthermore, the interval of SmC* phase is not wide enough to current requirements, the helix pitch for 3 mixtures is also close to top margin of acceptable values, and the driving voltage (30 V) was also too high for current application. No information on $V_c$ was provided.

JP05017409A describes diesters I ($R_1$-$R_2$=$C_{4-20}$ optically active group; n=0-2) and chiral smectic liquid-crystal compositions containing thereof. Chiral compounds show chiral smectic phase themselves or by mixing with smectic C liquid-crystal compounds and provide liquid-crystal display devices with high-speed response.

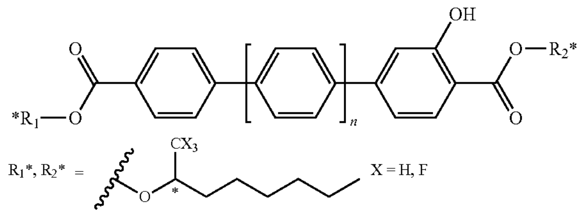

Electro optical data for 10 mol % mixtures of CC with achiral host of formula:

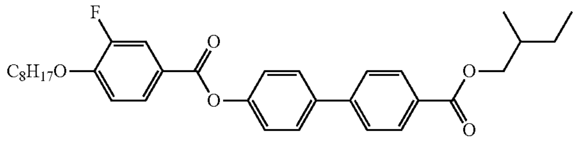

| | X | | | Configuration | | $P_S$nC/cm$^2$ | τ, μs | $P_S$ max |
|---|---|---|---|---|---|---|---|---|
| # | $R_1$* | $R_2$* | n | $R_1$* | $R_2$* | at Tc-10 | at Tc-10 | nC/cm$^2$ |
| 1 | H | H | 1 | S | S | 63.5 | 85 | 100.5(82.5° C.) |
| 2 | F | H | 1 | S | S | 39.6 | 93 | 113.0(85.0° C.) |
| 3 | F | H | 1 | R | R | 42.1 | 89 | 107.6(73.5° C.) |
| 4 | H | H | 2 | S | S | 51.7 | 50 | 107.7(108.0° C.) |

Pros of JP05017409A includes method of synthesis, provided chiral compounds with terphenyl- or quaterphenyl core bearing different substituents on each terminal site, and also showed high value of spontaneous polarization $P_S$.

However, cons of JP05017409A are that the FLC materials described are assigned to apply for SSFLC electrooptical effect. Thus, their parameters do not match with requirements to DHFLC, with respect to helix pitch values. Thus, the $CH_3$ and $CF_3$ groups at chiral center of the same configuration (either S or R) provides an opposite twisting of the helix [see Mikhailenko et. al., J. Mol. Liq. 281 (2019) 186-195]. If both these groups are embedded into the same molecule, the resultant pitch will be too high in order to observe the DHF. Biphenylpyrimidines are also not mentioned among the examples of achiral host.

JP05213827A describes optically active dihydroxyterphenyldicarboxylic acid diesters and chiral smectic liquid-crystal compositions with the chiral smectic liquid-crystal compositions containing ≥2 mol. % I ($R^{1-2}$═$C_{4-20}$ optically active group; n=0-2). Chiral smectic C liquid-crystal compositions containing I show large spontaneous polarization and high-speed response and are useful for display devices.

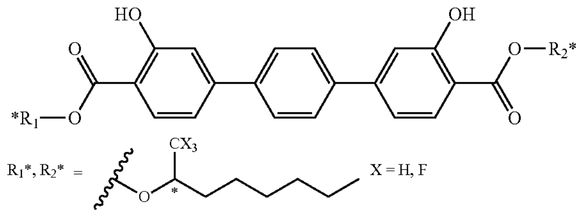

JP05213827A describes similar pros and cons as those in JP05017409A, except minor changes in the chemical structure of the chiral components.

EP546298A2 describes fatty acid esters by the general formula I ($R_1$=unsubstituted or substituted with ≥1 halogen $C_{1-12}$ alkyl or $C_{2-12}$ alkenyl groups in which a methylene group may be replaced by —O—; $R_2$=unsubstituted or substituted with >1 halogen $C_{1-12}$ alkyl or $C_{2-12}$ alkenyl groups in which ≥1 methylene group may be replaced by —O— and/or —COO— or —OOC—; Z1=a single bond or —$CH_2CH_2$—; A1, A2=independently selected unsubstituted or substituted with ≥1 halogen 1,4-phenylene, pyridin-2,5-diyl, or pyrimidin-2,5-diyl groups; A3=an unsubstituted or substituted with >1 halogen 1,4-phenylene, pyridin-2,5-diyl, pyrimidin-2,5-diyl, or trans-1,4-cyclohexylene group; and n=0 or 1; with the restrictions that ≥1 of A1, A2, and A3 are selected from pyridin-2,5-diyl and pyrimidin-2,5-diyl and that, if n=0, R1=a 1-E-alkenyl group and R2=an alkyl, alkoxy, or alkenyloxy group). Liquid crystal mixtures of ≥2 components including ≥1 of the esters are also described, as well as the use of the compounds for electrooptical applications (e.g., displays). EP546298A2 describes the optimization of the achiral host, with modification of common SmC hosts, composed of two-ring phenylpyrimidines, with three-ring compounds, which have an aliphatic ester tail in a terminal position. This optimization allowed reduction of the switching time due to decreasing viscosity. The chiral component used in EP546298A2 was the diester of terphenyldicarboxylic ester.

EP814368A2 describes electro-optical material capable of changing its optical property upon an application of an electric field, a lamellar liquid crystal(s) have a predetermined concentration of chiral molecules whose longitudinal axis is greater than lamellar liquid crystal forming molecules so that the longitudinal axis of the chiral molecules without application of electric field is statistically inclining a predetermined angle against a liquid crystal layer perpendicular direction.

Materials claimed in EP814368A2 are designed for the electrically driven tilt variation. The model of supposed packing of molecules according to EP814368A2 is given below. In EP814368A2, it is described that if the chiral molecules are longer than host molecules, the chiral compounds will adopt a certain pretilt in the LC mixture at the temperatures when SmA phase exists.

| The Host components | |
|---|---|
| 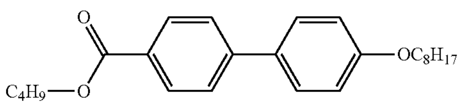 | 45 wt. % |
| 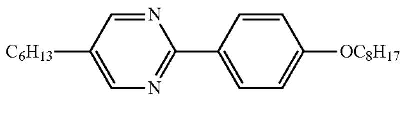 | 45 wt. % |

-continued

| The chiral component | |
|---|---|
| 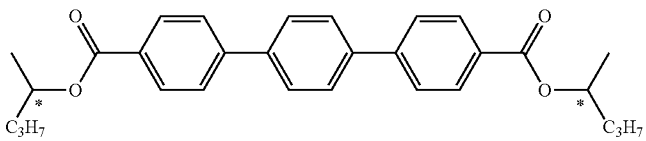 | 10 wt. % |

However, the SmC* phase formed by these components are narrow up to 42-43° C. and maximum tilt angle in the SmC* phase did not exceed 17°.

Beresnev et. al, Molecular Crystals and Liquid Crystals, 299:1, 525-539 utilizes the same materials and effects, which is described in EP814368A2, are also studied.

Mikhailenko et. al., J. Mol. Liq. 281 (2019) 186-195 describes the design and study of high-performance ferroelectric liquid crystal (FLC) materials. Combination of high twisting ability with large spontaneous polarization ($P_S$>100 nC/cm$^2$) resulted in promising FLC mixtures: almost defect-free alignment in electro-optical cells, the optical quality of the cells becomes comparable to that based on nematic liquid crystals, but faster switching time. The most important parameter responsible for the remarkable performance of the materials is their ultra-short helix pitch as low as 65 nm. The key components of new mixtures provided the advanced properties are high-twisting diesters of terphenyl-dicarboxylic acid and chiral 1,1,1-trifluoroalkan-2-ols (FO-TDA-n, n=4-8), the achiral host is mixture of two phenylpyrimidines or two biphenylpyrimidines:

Maximum tilt angle reported in Mikhailenko et. al., J. Mol. Liq. 281 (2019) 186-195 is 37°, which is low margin case according to the requirements to the FLC material. However, the mixtures showing tight enough helix pitch, acceptable $P_S$ and switching times, have unsatisfying phase transitions of ~12-18° C. for the best examples.

Kula et. al., Liquid Crystals, 40:1, 83-90 describes new synthetic approach for the chiral terphenyl- and quaterphenyl-based diesters, bis[(1S)-1-methylheptyl] 1,1':4',1'''-terphenyl-4,4'''-dicarboxylates and bis[(1S)-1-methylheptyl] 1,1':4',1'':4'',1'''-quaterphenyl-4,4'''-dicarboxylates, has been developed and optimised. The approach presented allows the synthesis of a range of laterally substituted oligophenyl diesters in good yield. A number of pairs of S,S and R,R isomers have been synthesized and their thermodynamic properties measured. Most of the compounds have very good solubility in a variety of liquid crystalline host mixtures, and moderate helical twisting power, which has been determined for a number of nematic materials, either dielectrically positive or negative. The high birefringence of the oligophenyl core makes them suitable candidates as chiral dopants for medium to highly birefringent nematic materials for generating cholesteric and blue phase materials.

Among the compounds, chiral quaterphenyl were described:

| | | |
|---|---|---|
| Chiral components | 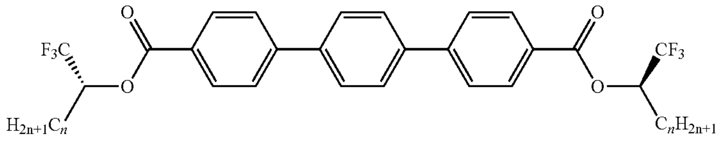 | |
| achiral hosts BPP-65-87 | 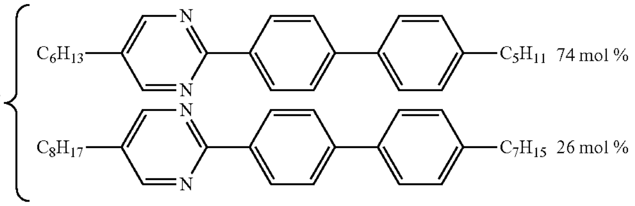 | 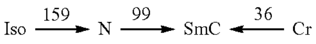 |
| PP-88-810 | 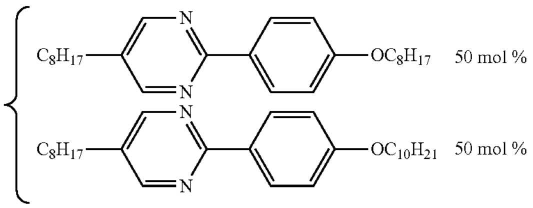 | 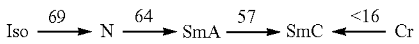 |

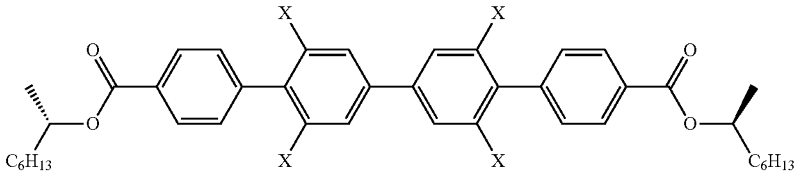

X = H, mp = 175° C.
X = F, mp = 147° C.

These compounds have two chiral groups on both sides of the molecule, however, the melting points (mp) are too high to provide required solubility in a liquid crystal host.

Bezborodov et. al., Liquid Crystals, 40:10, 1383-1390 describes the synthesis and mesomorphic properties of some new liquid crystalline quaterphenyl and cyclohexyl-terphenyl derivatives—the Ferroelectric liquid crystal (FLC) compositions based upon them. The FLC compositions containing the new quaterphenyl derivatives are characterized by a wide temperature range of the SmC* phase, a low operating voltage and a very good quality of orientation in the cells (thermal and the mechanical stable 'shock-free'). However, these materials are designed to application in electrooptical SSFLC mode required low-twisted FLC. Therefore, the molecules contain only one chiral group do not allow to obtain a sub-micron values of helix pitch.

EP0347941A2 and EP0293763A2 describe the synthesis and properties of 2-(4-alkylbiphenyl)-5-alkylpyrimidines.

Gray et. al., Perkin Transactions 2 (1989) 2041-2053 describes synthesis and properties of laterally fluorinated dialkyl terphenyls.

SUMMARY

In one aspect, there is provided a ferroelectric liquid crystal (FLC) material for the deformed helix FLC (DHFLC) electro-optical mode devices comprising at least two components and shows optimum electro-optical properties, wherein at least one FLC component is a chiral compound of Formula (I)

(I)

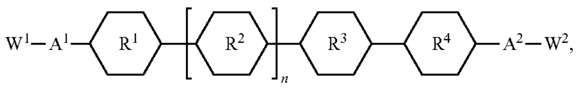

wherein:

- n is 0 or 1;
- $R^1$, $R^2$, $R^3$ and $R^4$ each independently are 1,4-phenylene, or pyrimidine-2,5-diyl, or pyridine-2,5-diyl, optionally substituted with one or more substituents selected from the group consisting of halogen and methyl, provided that both of the rings $R^1$ and $R^4$ are not unsubstituted 1,4-phenylene;
- $A^1$ and $A^2$ are independently absent, that has meaning the group $W^1$ or $W^2$ are directly attached to the rings $R^1$ or $R^4$, or selected from the group consisting of —O—, —S—, and ester; and
- $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl or cyano, and optionally one or more $CH_2$ are independently replaced with $CF_2$, O, or —CO— groups provided that two O atoms are not linked together.

Resuming the current state of art in the field of DHFLC materials, it can be concluded that each of the DHFLC parameters, θ, p0, $P_S$, $E_c$, in an ideal case should be controllable in a FLC composition independently in order to fit them as much as close to the optimal values. Since the molecule structures of the DHFLC components and their content affect several parameters simultaneously, it is a challenge to obtain an optimized DHFLC that would have an overall improvement in the performance. Therefore, there is a need to optimize each of the parameters to improve the performance of DHFLC electro-optical effect. There is also a need to provide set of new compounds or a combination thereof in FLC material that combines the effective optimal parameters that addresses or ameliorates the problems described above.

DETAILED DESCRIPTION

Definitions

The following words and terms used herein shall have the meaning indicated:

As used herein, the term "alkyl group" includes within its meaning monovalent straight chain or branched chain saturated aliphatic groups of general formulae $C_nH_{2n+1}$ where number of carbons (n) is varied from 4 to 16.

The term "alkenyl group" includes within its meaning monovalent ("alkenyl") and divalent ("alkenylene") straight or branched chain unsaturated aliphatic hydrocarbon groups having from 4 to 16 carbon atoms.

The term "average length" when used to refer to a compound or a moiety refers to the total length of a longest chain of atoms within the compound or the moiety. When the term "average length" is used in connection with a combination of at least two compounds, the term defines a concentration average of each compound's "average length".

Where the term "average length" is used in connection with a moiety, it may be estimated by the number of units and/or atoms in the moiety, such as $CH_2$, $CF_2$, O, —C(O)—. It is appreciated that the number of units and/or atoms is used interchangeably with the total length as described above for a rough comparison of "average length" of different moieties or different liquid crystal molecules.

Thus, if molecule has two alkyl chains $C_nH_{2n+1}$ and $C_mH_{2m+1}$, the total length of the two alkyl chains may be estimated as (n+m). When a material comprises of different compounds, the average total length can be calculated taking into account the concentration of each i-component, ie by equation:

$$\text{Average total length} = \sum_{i=1}^{i=k}(n_i + m_i)\frac{c_i}{100}$$

where k is number of compounds, c is concentration of each compound in %

Thus, as an example, the total "average length" of the achiral hosts BPP-2, BPP-4 and BPP-6 as described herein is 12.1, 12.3, and 12.0 respectively, i.e., around 12. The total length of the W and A in chiral dopant given in Example 1 is 18.

Similarly, it is appreciated that where the "average length" is used in connection with a moiety or a compound that comprises ring structures. The "average length" may be alternatively estimated based on the number of the ring structures if all of the ring structures (both aromatic and heteroaromatic) are 6-membered and have very similar sizes.

The term "helical twisting power" or HTP is used for characterization of ability of a chiral compound to induce the helical ordering in its mixture with an achiral liquid crystal of nematic or smectic-C type. The value of HTP is calculated either as $HTP=1/(p_0 \cdot c)$ or as tangent of linear part of dependence of $1/p_0$ from c, where $p_0$ is induced helix pitch at concentration of chiral compound c.

Unless specified otherwise, the terms "comprising" and "comprise", and grammatical variants thereof, are intended to represent "open" or "inclusive" language such that they include recited elements but also permit inclusion of additional, unrecited elements.

The term "about" as used herein typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

Exemplary, non-limiting embodiments of a FLC material for DHFLC electro-optical mode devices will now be disclosed.

The FLC material comprises at least two components and shows optimum electro-optical properties, wherein at least one FLC component is a chiral compound of Formula (I):

(I)

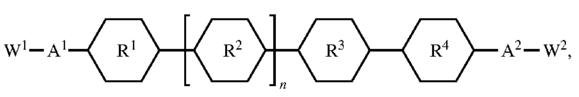

wherein:

n is 0 or 1;

$R^1$, $R^2$, $R^3$ and $R^4$ each independently are 1,4-phenylene, or pyrimidine-2,5-diyl, or pyridine-2,5-diyl, optionally substituted with one or more substituents selected from the group consisting of halogen and methyl, provided that both of the rings $R^1$ and $R^4$ are not unsubstituted 1,4-phenylene;

$A^1$ and $A^2$ are independently absent, that has meaning the group $W^1$ or $W^2$ are directly attached to the rings $R^1$ or $R^4$, or selected from the group consisting of —O—, —S—, and ester;

$W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl, or cyano, and optionally one or more $CH_2$ are independently replaced with $CF_2$, O, or —CO— groups provided that two O atoms are not linked together.

Advantageously, having both of the rings $R^1$ and $R^4$ being different from unsubstituted 1,4-phenylene may increase a tilt angle (θ) of a liquid crystal composition derived from the chiral compound of Formula (I). This may increase light transmission through liquid crystal cells in the liquid crystal composition and improve a contrast of the composition. This may also increase a twisting power of the chiral compound of Formula (I), thus allowing it to be used at a relatively low concentration in the FLC material.

$W^1$ and $W^2$ are independently substituted at their chiral center/centers with at least one moiety selected from the group consisting of F, Cl, trifluoromethyl, O, and cyano.

Advantageously, the FLC material may have high spontaneous polarization value of at least 50 $nC/cm^2$. This is due to highly polar groups (F, $CF_3$, O, etc.) at the chiral centers of the chiral components.

As an example, $R^1$, $R^2$, $R^3$ and $R^4$ each independently may be 1,4-phenylene optionally substituted with two or three substituents selected from the group consisting of halogen and methyl.

As an example, $R^1$ and $R^4$ may be independently selected from the group consisting of pyrimidine-2,5-diyl, pyridine-2,5-diyl and 1,4-phenylene, wherein the 1,4-phenylene is substituted with at least one F atom.

As an example, $W^1$ and $W^2$ may be selected from the group consisting of:

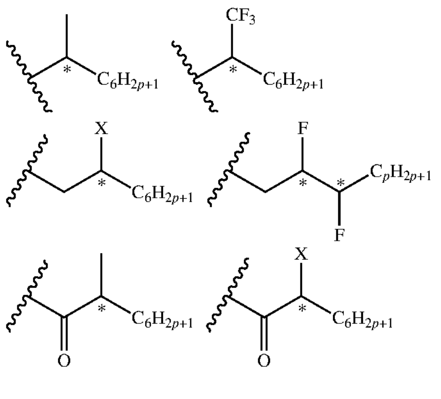

-continued

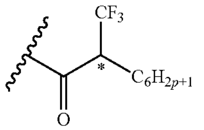

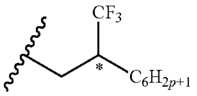

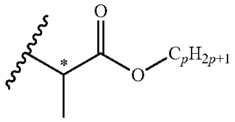

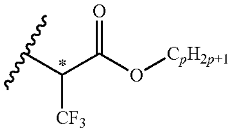

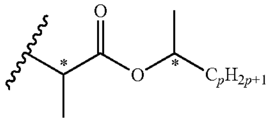

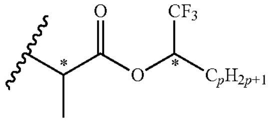

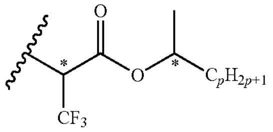

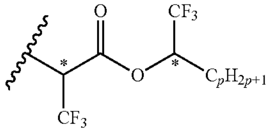

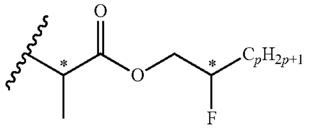

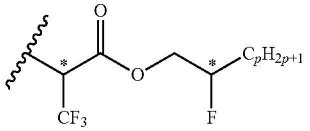

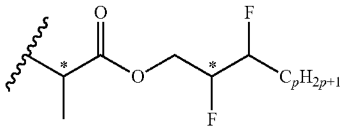

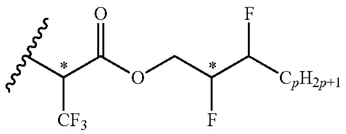

wherein

* denotes a chiral carbon atom;

X is fluoro or chloro, cyano; and p is an integer in the range of 2 to 10 (that is, p is 2, 3, 4, 5, 6, 7, 8, 9 or 10).

As an example, the chiral compound of Formula (I) may be of Formula (Ia):

(Ia)

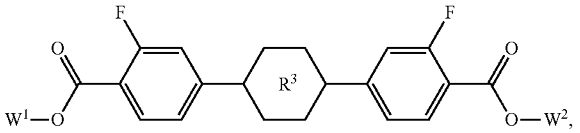

wherein $R^3$ is 1,4-phenylene, or pyrimidine-2,5-diyl, or pyridine-2,5-diyl, optionally substituted with one or more substituents selected from the group consisting of halogen and methyl, and $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl, or cyano and optionally one or more $CH_2$ are independently replaced with $CF_2$, O, or —CO— groups provided that two O atoms are not linked together.

As an example, the chiral compound of Formula (I) may be of Formula (Ib):

(Ib)

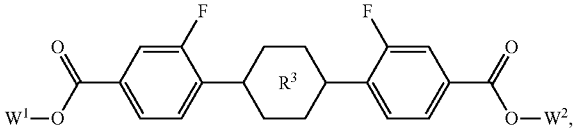

wherein $R^3$ is 1,4-phenylene, or pyrimidine-2,5-diyl, or pyridine-2,5-diyl, optionally substituted with one or more substituents selected from the group consisting of halogen and methyl, and $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl or cyano, and optionally one or more $CH_2$ are independently replaced with $CF_2$, O, or —CO— groups provided that two O atoms are not linked together.

As an example, the chiral compound of Formula (I) may be of Formula (Ic):

(Ic)

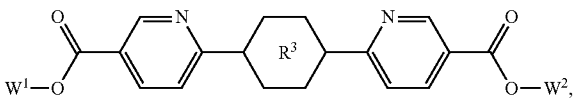

wherein $R^3$ is 1,4-phenylene, or pyrimidine-2,5-diyl, or pyridine-2,5-diyl, optionally substituted with one or more substituents selected from the group consisting of halogen or methyl, and $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl or cyano and optionally one or more $CH_2$ are independently replaced with $CF_2$, O, or —CO— groups provided that two O atoms are not linked together.

As an example, the chiral compound of Formula (I) may be of Formula (Id):

(Id)

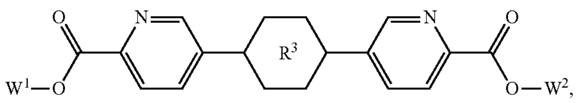

wherein $R^3$ is 1,4-phenylene, or pyrimidine-2,5-diyl, or pyridine-2,5-diyl, optionally substituted with one or more substituents selected from the group consisting of halogen or methyl, and $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl, or cyano, and optionally one or more $CH_2$ are independently replaced with $CF_2$, O, or —CO— groups provided that two O atoms are not linked together.

As an example, the chiral compound of Formula (I) may be of Formula (Ie):

(Ie)

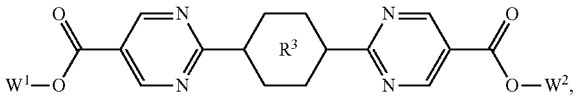

wherein:

$R^3$ is 1,4-phenylene, or pyrimidine-2,5-diyl, or pyridine-2,5-diyl, optionally substituted with one or more substituents selected from the group consisting of halogen or methyl, and $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl or cyano, and optionally one or more $CH_2$ are independently replaced with $CF_2$, O, or —CO— groups provided that two O atoms are not linked together.

As an example, the chiral compound of Formula (I) may be of Formula (If):

(If)

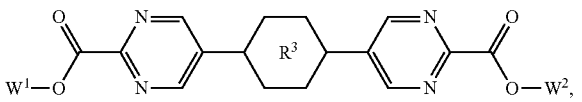

wherein:

$R^3$ is 1,4-phenylene, or pyrimidine-2,5-diyl, or pyridine-2,5-diyl, optionally substituted with one or more substituents selected from the group consisting of halogen or methyl, and $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl or cyano and optionally one or more $CH_2$ are independently replaced with $CF_2$, O, or —CO— groups provided that two O atoms are not linked together.

The chiral compound of Formula (I) may be selected from the group consisting of:

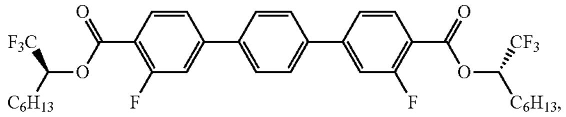

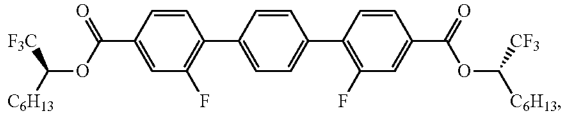

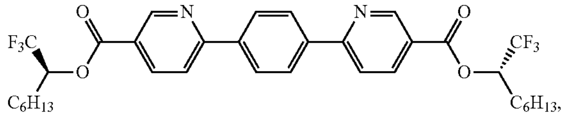

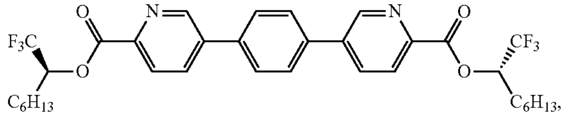

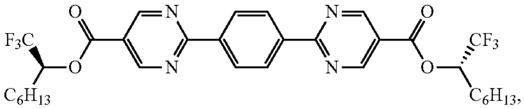

and

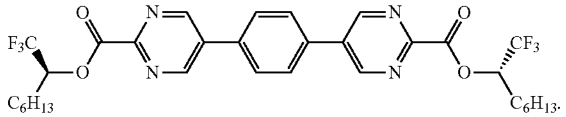

The FLC material may further comprise at least one achiral smectic C liquid crystal compound of Formula (II):

(II)

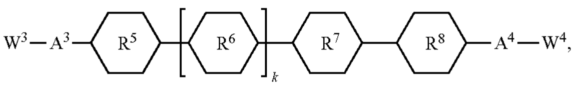

wherein:

$R^5$, $R^6$, $R^7$, and $R^8$ independently are 1,4-phenylene, or pyrimidine-2,5-diyl, or pyridine-2,5-diyl, optionally substituted with at least one substituent selected from the group consisting of halogen and methyl;

k is 0 or 1;

$A^3$ and $A^4$ are independently absent or selected from the group consisting of —O—, —S—, and ester; and $W^3$ and $W^4$ are independently alkyl $C_mH_{2m+1}$ or alkenyl $C_mH_{2m}$, wherein m=4-12, and optionally one or more hydrogens are independently replaced by F, furthermore, optionally one or more $CH_2$ are independently replaced with $CF_2$, O, or —CO— groups provided that two O atoms are not linked together.

Advantageously, the liquid crystal composition may have a high upper limit of smectic liquid crystal phase and a low melting point.

Further advantageously, as the liquid crystal composition comprises three or four aromatic rings, it may have a desired birefringence value, such as in the range of about 0.14 to about 0.26.

As an example, the achiral smectic C liquid crystal compound of Formula (II) may be of the Formula (IIa):

(IIa)

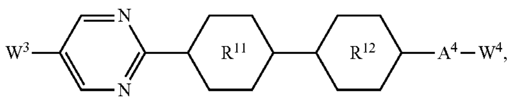

wherein $R^{11}$ and $R^{12}$ independently are 1,4-phenylene, or pyrimidine-2,5-diyl, or pyridine-2,5-diyl, optionally substituted with at least one substituent selected from the group consisting of halogen and methyl, and $W^3$ and $W^4$ are independently alkyl $C_mH_{2m+1}$ or alkenyl $C_mH_{2m}$, wherein m=4-12, and optionally one or more hydrogens are independently replaced by F, furthermore, optionally one or more $CH_2$ are independently replaced with $CF_2$, O, or —CO— groups provided that two O atoms are not linked together; and $A^4$ is absent or selected from the group consisting of —O—, —S—, and ester.

Advantageously, when the achiral smectic C liquid crystal compound of Formula (II) has a three-ring aromatic core, which can provide high upper limit of smectic phase, reaching at least about 100° C. Further advantageously, a combination of at least three compounds of Formula (II) may have a melting point of about from 14 to 20° C., which can be easily further reduced to 0° C. when combined with additional chiral compounds of Formula I or two-rings achiral smectic materials of Formula II such as 2-ring phenylpyrimidines or phenylpyridines.

As an example, the achiral smectic C liquid crystal compound of Formula (II) may be selected from the group consisting of:

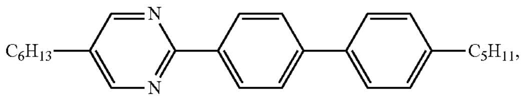

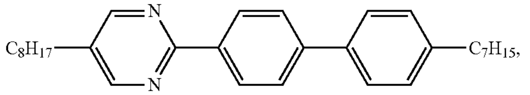

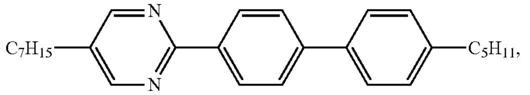

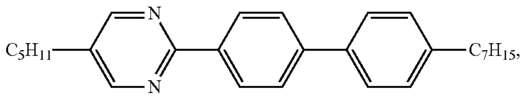

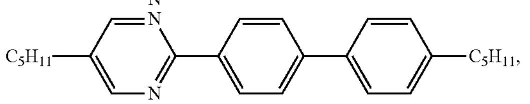

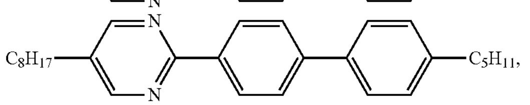

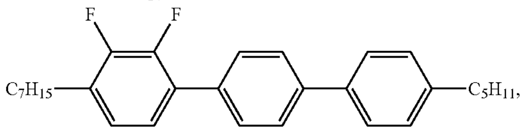

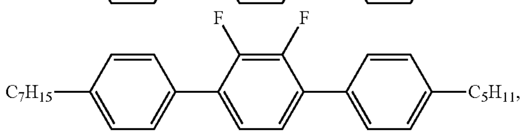

-continued

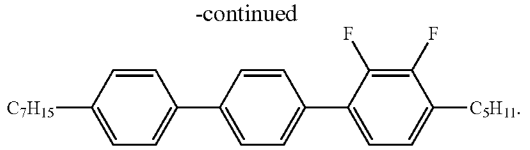

The FLC material may comprise more than one achiral smectic C liquid crystal compound of Formula (II), thus in one example, the liquid crystal composition may comprise:

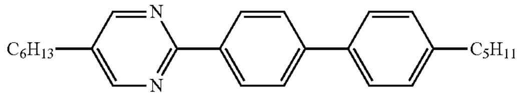

and

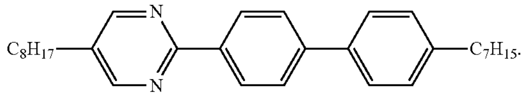

In another example, the FLC material may comprise:

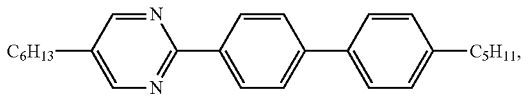

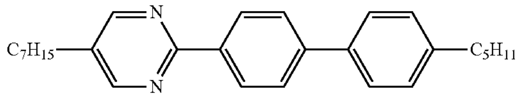

and

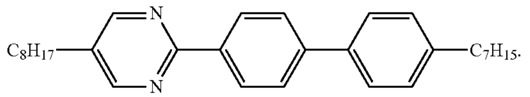

In another example, the FLC material may comprise:

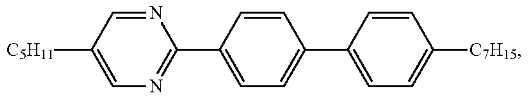

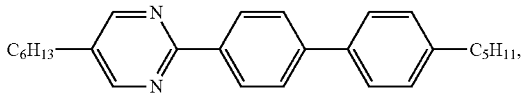

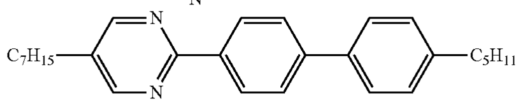

and

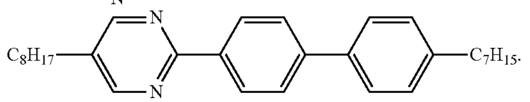

In another example, the FLC material may comprise:

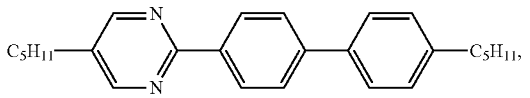

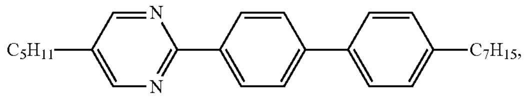

-continued

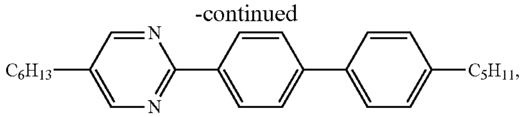

,

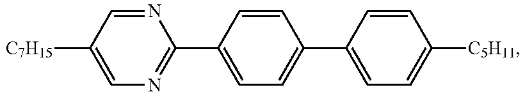

,

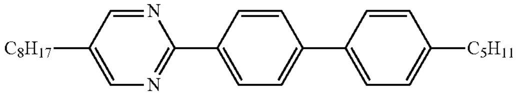

and

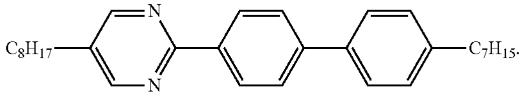

.

In another example, the FLC material may comprise:

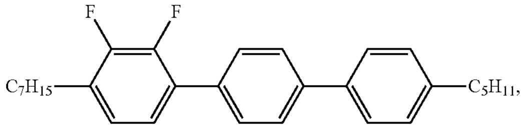

,

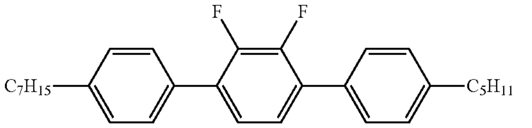

and

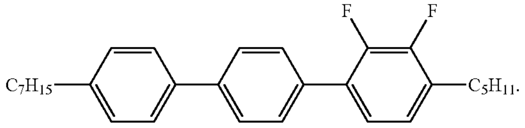

.

Where the FLC material comprises more than one achiral smectic C liquid crystal compound of Formula (II), the more than one achiral smectic C liquid crystal compound of Formula (II) may be combined at a molar ratio that provides a suitable melting point of the FLC material. As an example, the more than one achiral smectic C liquid crystal compound of Formula (II) may be composed at about eutectic composition.

In the liquid crystal composition, the total number of rings in $R^1$, $R^2$, $R^3$ and $R^4$ may be equal to the total number of rings in $R^5$, $R^6$, $R^7$ and $R^8$.

As an example, an average length of $W^1$ and $W^2$ may be larger than an average length of $W^3$ and $W^4$.

Advantageously, where the average length of $W^1$ and $W^2$ is larger than the average length of $W^3$ and $W^4$ as described above, the liquid crystal composition may have a high helical twisting power that reaches up to about 50.

As an example, the average length of $W^1$ and $W^2$ may be equal to an average length of $W^3$ and $W^4$ or larger than that by up to 2-times.

Advantageously, setting an upper limit of about 2-times may avoid undesired reduction of tilt angle of the liquid crystal composition.

The chiral compound of Formula (I) and the achiral smectic C liquid crystal compound of Formula (II) may have a molar ratio in the range of about 10:90 to about 40:60, preferably of about 10:90 to about 30:70, more preferably of about 20:80 to about 30:70.

Advantageously, where the chiral compound of Formula (I) has the molar ratio as described above, the FLC material may have a low viscosity.

The FLC material may have a smectic-C* phase having a range of at least about 10 to about 85° C., or wider.

The FLC material may have a tilt angle in the range of about 35 degrees to about 47 degrees, preferably of about 40 degrees to about 45 degrees.

The FLC material may have a high spontaneous polarization. As an example, where the chiral compound of Formula (I) has a concentration of less than 20 molar % based on the total number of moles of the FLC material, the FLC material may have a spontaneous polarization of larger than 50 nC/cm$^2$ or preferably larger than 100 nC/cm$^2$ at standard ambient temperature (such as 25° C.) and pressure (such as 1 atm).

The liquid crystal composition may have a short helix pitch. As an example, where the chiral compound of Formula (I) has a concentration of less than 20 molar % based on the total number of moles of the FLC material, the FLC material may have a helix pitch of less than 250 nm, or preferably less than 120 nm at standard ambient conditions (temperature 25° C. and pressure 1 atm).

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

EXAMPLES

General

Figure 1:
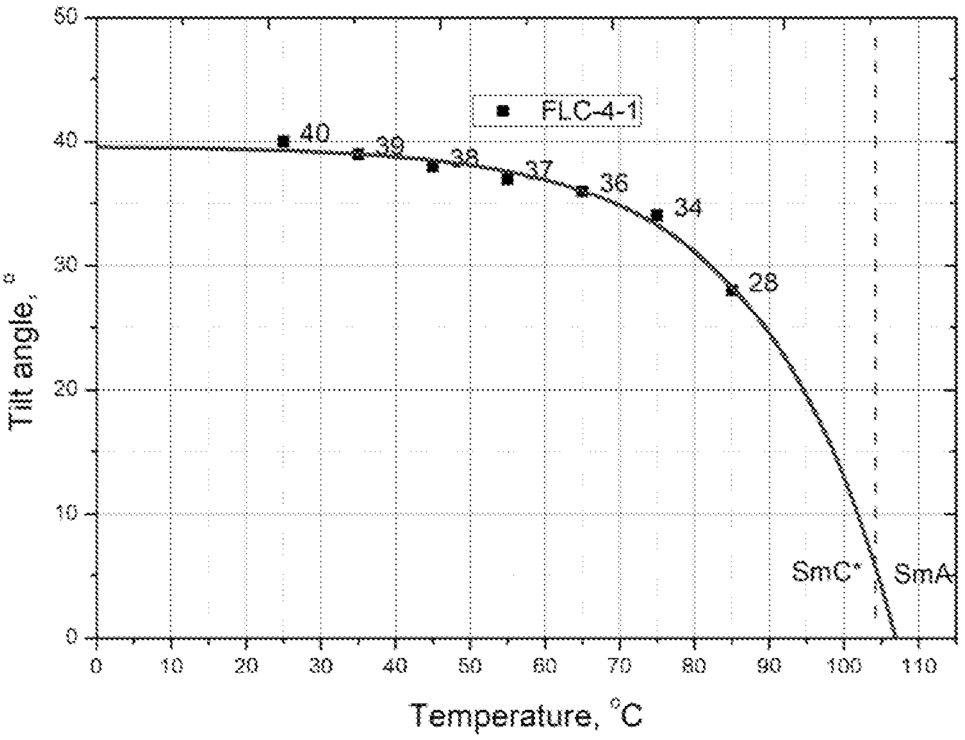
FIG. 1 shows temperature dependence of tilt angle for the mixture FLC-4-1. The vertical dotted line denoted the temperature of the phase transition SmC*→SmA in absence of external electric field.

Non-limiting examples of the invention and comparative examples will be further described in greater detail by reference to specific Examples, which should not be construed as in any way limiting the scope of the invention.

All chemicals are commercially available from Merck, Meryer, Dieckmann HK, Fluorochem or TCI and used as received unless otherwise specified. Biphenylpyrimidines were supplied by TitanSci, China. Silica gel used for flash chromatography was Silica gel 60 (0.040-0.060 mm). Thin Layer chromatography (TLC) was performed on TLC plates, Merck, UV254, using an appropriate solvent as an eluent.

The following abbreviation for the common chemicals were used:

| | |
|---|---|
| DCC - dicyclohexylcarbodiimide | dppf - bis(diphenylphosphino)ferrocene |
| DCM - dichloromethane | SDS - sodium dodecylsulphate |
| DMAP - 4-N,N-dimethylaminopyridine | TolH - toluene |
| DMF - N,N-dimethylformamide | |

The cell of 15-25 μm coated onto inner side with chromolane as a vertically aligning material were used.

FLC properties for the mixtures were measured in ITO coated glass cell of 1.6-1.7 μm thickness; inner side of the cell were coated with 30 nm layer of Nylon-6 rubbed unidirectionally. The cell was mounted in a custom-made hot stage, providing temperature control ±0.1° C.

The spontaneous polarization ($P_S$) was measured by the flipping current across a cascaded 560 kOhm resistance. The flipping current across the resistor is measured by the oscilloscope.

Synthesis of chiral 2-trifluoromethylalkanols with ee>97% were carried out as described by V. Mikhailenko, D. Yedamenko, G. Vlasenko, A. Krivoshey, V. Vashchenko// Tetrahedron Lett.-2015.-Vol. 56, Is. 43.-P. 5956-5959.

Chiral components with unsubstituted central terphenyl ring (S-FODTA-n) that was used as comparative compounds:

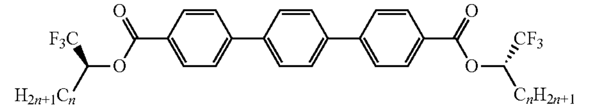

n = 5, S-FODTA-5
n = 6, S-FODTA-6
n = 7, S-FODTA-7 were synthesized as described in Mikhailenko et. Al., J. Mol. Liq. 281 (2019) 186-195.

Two-ring phenylpyrimidines were synthesized as described by Kenji Shinjo, Takao Takiguchi, Hiroyuki Kitayama, Kazuharu Katagiri, Masahiro Terada, Takeshi Togano, Masataka Yamashita, Takashi Iwaki, Shosei Mori, Chiral smectic liquid crystal composition and liquid crystal device using same, EP0347941A2, priority 1988 Jun. 24 and by Terashima, Kanetsugu; Ichihashi, Mitsuyoshi; Takeshita, Fusayuki; Kikuchi, Makoto; Furukawa, Kenji EP 293.763 (1988/12/07).

Difluoroterphenyls were synthesized as described by G. W. Gray, M. Hird, D. Lacey, K. J. Toyne, Journal of the Chemical Society, Perkin Transactions 2 (1989) 2041-2053.

Degassing of solution were carried out by its sequential 3 cycles of pumping out to ~100 mbar and filling with $N_2$.

Mixtures of compounds were prepared by thoroughly stirring the appropriate amounts of components using a shaker or magnetic stirrer at temperature 110-120° C. under nitrogen atmosphere for at least 10 min.

Phase transition of the LC mixtures were determined by differential scanning calorimetry using ThermoScientific DSC-25 instrument. Assignment of the LC phase were carried out by polarizing microscopy using Olympus BX-60 microscope equipped with custom made hot stage.

Helix pitch in the absence of external voltage ($p_0$) were measured by selective reflection of the light at both normal and oblique incidence of the light as it was described in prior art Mikhailenko et. Al., J. Mol. Liq. 281 (2019) 186-195.

Tilt angle was measured by rotating the cell while a square wave with Vpp 10V/um is applied on the cell. Tilt angle is half of the rotation angle when the output intensity drops to zero for positive or negative polarity of the signal.

Response time is time required to change the optical transmittance from 10% to 90%.

Critical voltage of helix unwinding was determined as the critical voltage when the response time reaches the maximum value.

The examples 1-16 disclose the methods of synthesis of compounds according to the claims that are used as chiral components.

Example 1

Synthesis of bis-(S-1-trifluoromethylheptyl) 2,2"-difluoro-[1,1':4',1"-ter-phenyl]-4,4"-dicarboxylate (1b) was carried out in two steps accordingly to the scheme below:

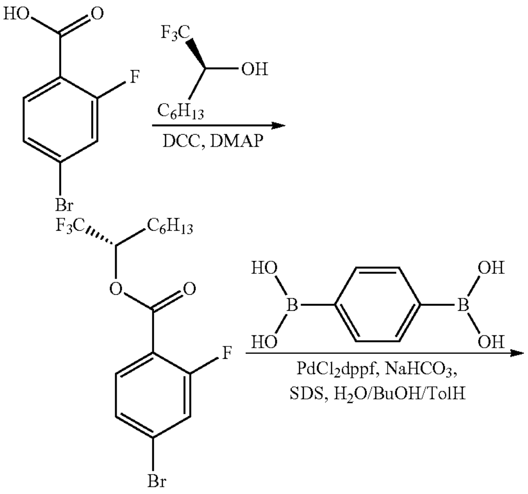

1a

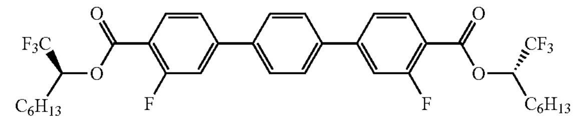

1b

S-1-(trifluoromethyl)heptyl-2-fluoro-4-bromobenzoate (1a)

A solution of 3.27 g (15.8 mmol) of DCC in 20 ml of dry DCM was added dropwise to a stirred and cooled (ice-water) mixture of 2.89 g (13.2 mmol) of 2-fluoro-4-bromobenzoic acid, 2.28 g (12.4 mmol) of S-2-(trifluoromethyl)-heptanol and 5 mg of DMAP in 30 ml of DCM. The mixture was then stirred until reaction was completed, which was monitored by TLC, then filtered through the short plug of silica gel. The silica gel was washed additionally with 150 ml of DCM. The combined solutions in DCM was evaporated to dryness furnishing product 1a, 5.2 g of oil, which solidified upon storage and used in the next step without additional purification.

Bis-(S-1-trifluoromethylheptyl) 2,2"-difluoro-[1,1':4',1"-terphenyl]-4,4"-dicarboxylate (1b)

A mixture of 2.22 g (5.8 mmol) of 1a, 0.40 g (2.4 mmol) of 1,4-phenylenediboronic acid, 0.30 g of SDS, 0.171 g of $PdCl_2$dppf, 5 ml of 1-butanol, 10 ml of water, and 30 ml of toluene was degassed, then heated to reflux and added dropwise a degassed solution of 2.90 g (34.8 mmol) of $NaHCO_3$ in 20 ml of water. The reaction mixture was refluxed additionally for 2 hours, then cooled down to ambient temperature and the organic layer was separated. The remaining aqueous layer was then extracted three times with toluene. The combined organic layers were then washed with water, dried over $Na_2SO_4$, purified by flash chromatography with toluene on short plug of silica gel and the resulting fractions containing the desired product in toluene was evaporated to dryness. The residual was purified by column chromatography on silica gel [50×2 cm, eluent TolH:Hexane (1:1 w/w)], and yielded 1.00 g (62%) of the product (1b) as a colorless oil.

Example 2

Synthesis of bis-(S-1-trifluoromethyloctyl) 2,2"-difluoro-[1,1':4',1"-terphenyl]-4,4"-di-carboxylate

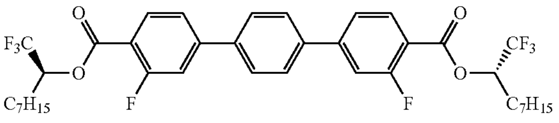

Following the protocol described in Example 1, bis(S-1-trifluoromethyloctyl) 2,2"-difluoro-[1,1':4',1"-terphenyl]-4,4"-dicarboxylate was synthesized using the starting materials 2-fluoro-4-bromobenzoic acid 2.19 g (10 mmol); S-1-(trifluoromethyl)octanol 1.70 g (10 mmol); 1,4-phenylenediboronic acid 0.59 g (3.50 mmol) to yield 1 g (40%) of the desired product as a colorless oil.

Example 3

Synthesis of bis-(S-1-trifluoromethylhexyl) 2,2"-difluoro-[1,1':4',1"-terphenyl]-4,4"-dicarboxylate

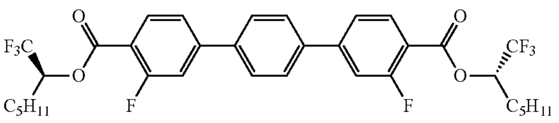

Following the protocol described in Example 1, bis-(S-1-trifluoromethylhexyl) 2,2"-difluoro-[1,1':4',1"-terphenyl]-4,4"-dicarboxylate was synthesized using the starting materials 2-fluoro-4-bromobenzoic acid 2.19 g (10 mmol); S-1-(trifluoromethyl)hexanol 1.70 g (10 mmol); 1,4-phenylenediboronic acid 0.60 g (3.62 mmol) to yield 1.10 g (46%) of the desired product as a colorless oil.

Example 4

Synthesis of bis-(S-1-trifluoromethylheptyl) 3,3"-difluoro-[1,1':4',1"-terphenyl]-4,4"-dicarboxylate

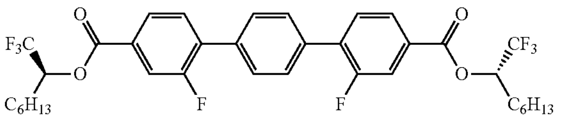

Following the protocol described in Example 1, bis(S-1-(trifluoromethyl)heptyl) 3,3"-difluoro-[1,1':4',1"-terphenyl]-4,4"-dicarboxylate was synthesized using the starting materials 3-fluoro-4-bromobenzoic acid 1.78 g (8.1 mmol); S-1-(trifluoromethyl)heptanol 1.51 g (8.2 mmol); 1,4-phenylenediboronic acid 0.60 g (3.62 mmol) to yield 1.21 g (49%) of the desired product as colorless oil.

Example 5

Synthesis of bis-(S-1-trifluoromethylheptyl) 2,3,2",3"-tetrafluoro-[1,1':4',1"-terphenyl]-4,4"-dicarboxylate

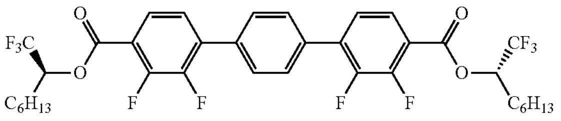

Following the protocol described in Example 1, bis-(S-1-trifluoromethylheptyl) 2,3,2",3"-tetrafluoro-[1,1':4',1"-terphenyl]-4,4"-dicarboxylate was synthesized using the starting materials 2,3-difluoro-4-bromobenzoic acid 1.45 g (6.1 mmol); S-1-(trifluoromethyl)heptanol 1.130 g (6.1 mmol); 1,4-phenylenediboronic acid 0.50 g (3.02 mmol) to yield 1.20 g (55%) of the desired product with a melting point 63° C.

Example 6

Synthesis of bis(S-1-trifluoromethyl-heptyl) 6,6'-(1,4-phenylene)dipicolinate

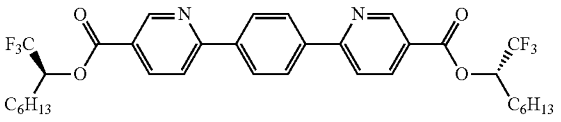

Following the protocol described in Example 1, bis((S)-1-trifluoromethyl-heptyl) 6,6'-(1,4-phenylene)dipicolinate was synthesized using the starting materials 6-bromo-nicotinic acid 2.024 g (10 mmol); S-1-(trifluoromethyl)heptanol 1.760 g (9.54 mmol); 1,4-phenylenediboronic acid 0.624 g (3.76 mmol) to yield 1.00 g (41%) of the desired product having a melting point of 57° C.

Example 7

Synthesis of bis(S-1-trifluoromethylheptyl) 5,5'-(1,4-phenylene)dipicolinate

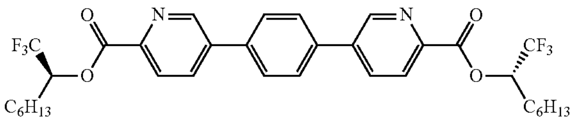

Following the protocol described in Example 1, bis((S)-1-trifluoromethylheptyl) 5,5'-(1,4-phenylene)dipicolinate was synthesized using the starting materials 5-bromopicolinic acid 1.94 g (9.6 mmol); S-1-(trifluoromethyl)heptanol 1.79 g (9.7 mmol); 1,4-phenylene-diboronic acid 0.58 g (3.5 mmol) to yield 0.85 g (37%) of the desired product having a melting point of 49° C.

Example 8

Synthesis of bis(S-1-trifluoromethylheptyl) 2,2'-(1,4-phenylene)bis(pyrimidine-5-carboxylate)

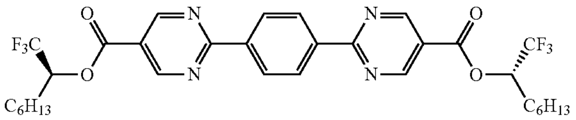

Following the protocol described in Example 1, bis(S-1-trifluoromethylheptyl)-2,2'-(1,4-phenylene)bis(pyrimidine-5-carboxylate) was synthesized using the starting materials 2-bromopyrimidine-5-carboxylic acid 2.03 g (10 mmol); S-1-(trifluoromethyl)heptanol 1.86 g (10.1 mmol); 1,4-phenylenediboronic acid 0.58 g (3.5 mmol) to yield 1.02 g (45%) of the desired product having a melting point of 62° C.

Example 9

Synthesis of bis-(S-1-trifluoromethylheptyl) 5,5'-(1,4-phenylene)bis(pyrimidine-2-carboxylate)

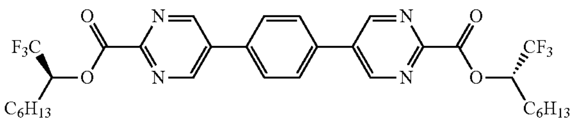

Following the protocol described in Example 1, bis((S)-1-(trifluoromethyl)heptyl) 5,5'-(1,4-phenylene)-bis(pyrimidine-2-carboxylate) was synthesized using the starting materials 5-bromopyrimidine-2-carboxylic acid 1.55 g (7.6 mmol); S-1-(trifluoromethyl)-heptanol 1.50 g (8.1 mmol); 1,4-phenylenediboronic acid 0.43 g (2.6 mmol) to yield 0.85 g (50%) of the desired product having a melting point of 70° C.

Example 10

Synthesis of bis((S)-octan-2-yl) 3,3"-difluoro-[1,1':4',1"-terphenyl]-4,4"-dicarboxylate

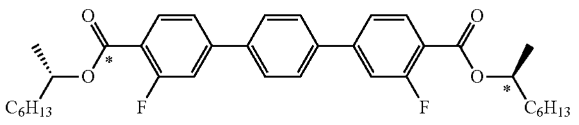

Following the protocol described in Example 1, bis((S)-octan-2-yl) 3,3"-difluoro-[1,1':4',1"-terphenyl]-4,4"-dicarboxylate was synthesized using the starting materials 2-fluoro-4-bromobenzoic acid 2.19 g (10 mmol); S-2-methylheptanol 1.30 g (10 mmol); 1,4-phenylenediboronic acid 0.50 g (3 mmol) to yield 0.902 g (52%) of the desired product as colorless oil.

Example 11

Synthesis of 4-((S)-1-ethoxy-1-oxopropan-2-yl) 4"-((S)-1,1,1-trifluorooctan-2-yl) [1,1':4',1"-terphenyl]-4,4"-dicarboxylate (11c) was carried out in three steps accordingly to the scheme below:

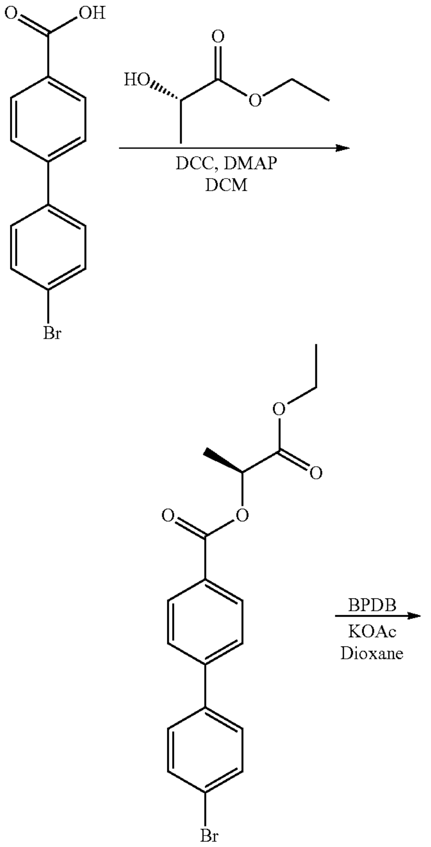

11a

-continued

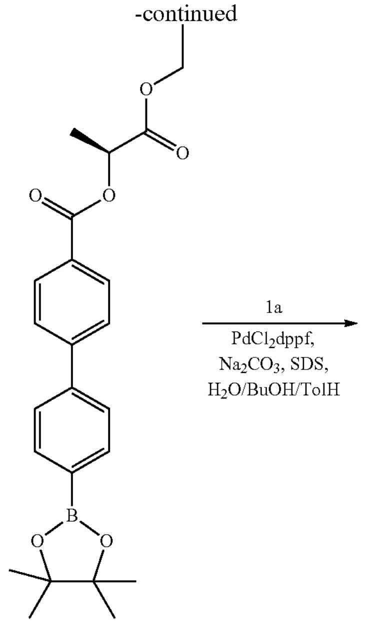

11b

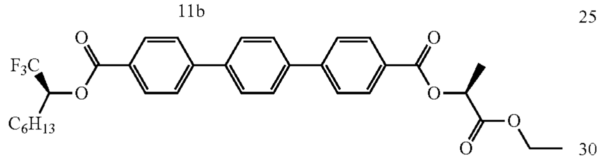

11c

Synthesis of (S)-1-ethoxy-1-oxopropan-2-yl 4'-bromo-[1,1'-biphenyl]-4-carboxylate (11a)

To the suspension of 4'-bromo-[1,1'-biphenyl]-4-carboxylic acid (3.6 g, 13 mmol), (S)-(−)-ethyl lactate (1.69 g, 14.3 mmol) and DMAP (1.9 g, 15.6 mmol) in dry DCM (100 ml) a solution of DCC (3.2 g, 15.6 mmol) in 60 ml of dry DCM was added dropwise at 5° C. with stirring. The mixture was warmed to ambient temperature and stirred for 18 hours. Then it was filtered through a short pad of Celite, filtrate was washed sequentially by diluted HCl, saturated sodium carbonate and brine, then organic layer evaporated to dryness. The residue after evaporation was purified by flash chromatography on silica gel with mixture toluene and hexane (1/1) yielding 4.6 g of 11a (94%) as a yellowish oil.

Synthesis of (S)-1-ethoxy-1-oxopropan-2-yl 4'-(4,4,5,5-tetramethyl-1,3,2-dioxaborolan-2-yl)-[1,1'-biphenyl]-4-carboxylate (11b)

The degassed mixture of 2 g (5.32 mmol) of 11a, 2 g (7.78 mmol) of bis-(pinacolato)-diboron, 2.34 g of anhydrous potassium acetate, 0.08 g of $PdCl_2$dppf (0.106 mmol) in 25 ml of dioxane was stirred at 85° C. for 16 hours. After cooling down to ambient temperature product was extracted with ethyl acetate (3×20 ml). The combined organic layers were then washed with water and evaporated to dryness. Residue was purified by flash chromatography silica gel, eluent Toluene:Hexane (1:1 v/v). Fractions containing the desired product was evaporated to dryness furnishing 2.1 g of 11b (93%) as yellowish oil.

Synthesis of 4-((S)-1-ethoxy-1-oxopropan-2-yl) 4"-((S)-1,1,1-trifluorooctan-2-yl) [1,1':4',1"-terphenyl]-4,4"-dicarboxylate (tic)

A mixture of 1 g (2.36 mmol) of 11b, 0.739 g (2.36 mmol) of 1a (see Example 1), 0.052 g, (0.071 mmol) of $PdCl_2$dppf, and SDS (0.3 mg) in a mixture of toluene (30 ml), n-butanol (5 ml), and $H_2O$ (20 ml) was degassed in vacuo and flushed with nitrogen for five times followed by heating to reflux with stirring. To the refluxed mixture a solution of $Na_2CO_3$—$H_2O$ (0.880 g, 6.08 mmol) in 10 ml of water degassed by nitrogen bubbling was added. The resulted mixture was stirred at reflux for 3 hours and cooled. The organic layer was separated and the water one was extracted with toluene (3×20 ml). The organic extracts were collected, washed with water and evaporated to dryness. The residue was purified by flesh chromatography on silica gel with mixture toluene and hexane (1/1) and recrystallized successively from hexane and acetonitrile. Yield 0.36 g (28%).

Example 12

Synthesis of 4"-((S)-1-ethoxy-1-oxopropan-2-yl) 4-((S)-1,1,1-trifluorooctan-2-yl) 3-fluoro-[1,1':4',1"-terphenyl]-4,4"-dicarboxylate

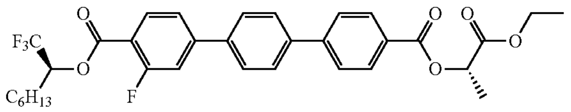

Following the protocol described in Example 11, 4"-((S)-1-ethoxy-1-oxopropan-2-yl) 4-((S)-1,1,1-trifluorooctan-2-yl) 3-fluoro-[1,1':4',1"-terphenyl]-4,4"-dicarboxylate was synthesized using as the starting materials (S)-1,1,1-trifluorooctan-2-yl 4-bromo-2-fluorobenzoate (0.905 g, 2.36 mmol); the yield was 0.32 g (23%) of the desired product as colorless solid.

Example 13

Synthesis of Bis((S)-1,1,1-trifluorooctan-2-yl) [2,2'-binaphthalene]-6,6'-dicarboxylate (13c) was carried out in three steps accordingly to the scheme below:

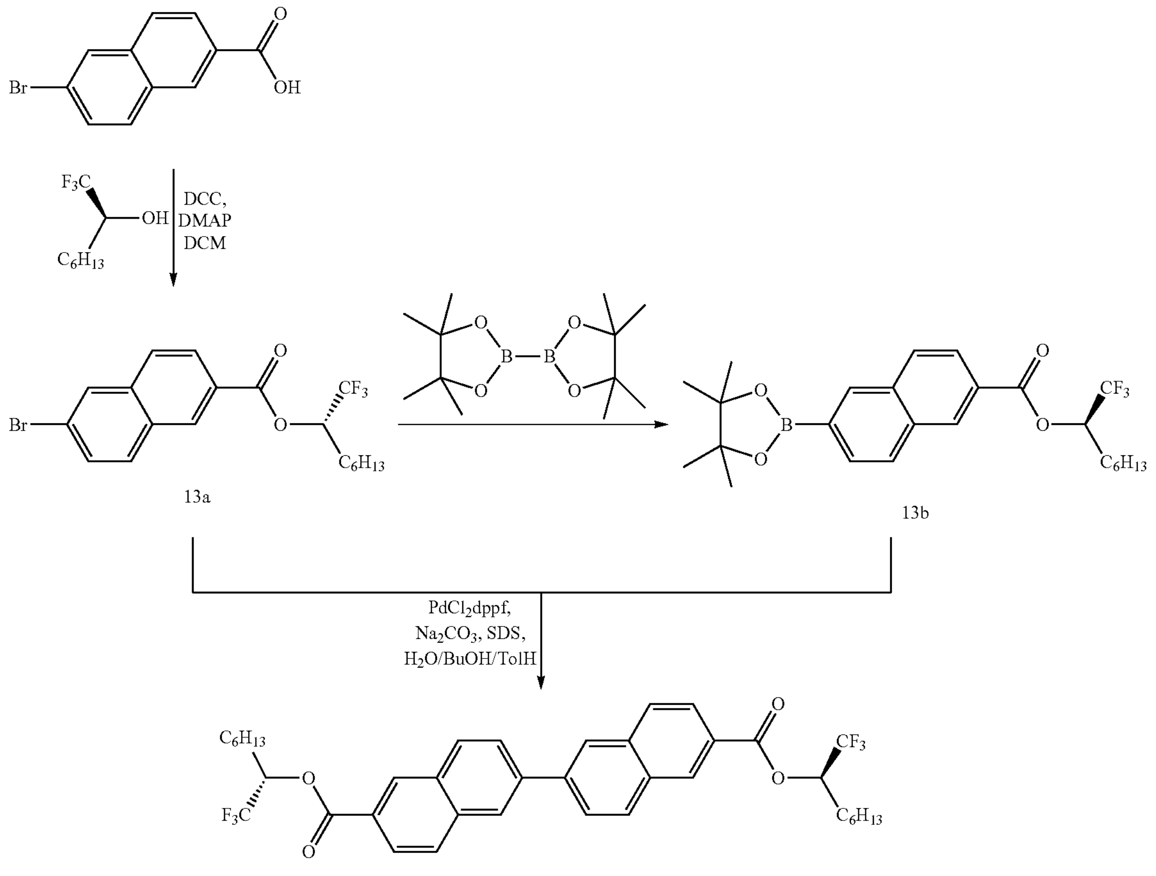

13c

Synthesis of (S)-1,1,1-trifluorooctan-2-yl 6-bromo-2-naphthoate (13a)

To a suspension of 6-bromo-2-naphthoic acid (2.98 g, 11.9 mmol), (S)-1,1,1-trifluorooctan-2-ol (2.29 g, 12.4 mmol) and DMAP (160 mg, 1.3 mmol) in dry dichloromethane (90 ml) a solution of DCC (2.95 g, 14.3 mmol) in dry dichloromethane (40 ml) was added drop wise at 0-5° C. with stirring. The mixture was left to warm to room temperature overnight with stirring. Then it was filtered through a short pad of Celite and evaporated to dryness. The residue after evaporation was purified by flash chromatography with hot heptane giving after evaporation 13a as a clear solid. Yield 1.5 g (32%).

Synthesis of 1,1,1-Trifluorooctan-2-yl 6-(4,4,5,5-tetramethyl-1,3,2-dioxaborolan-2-yl)-2-naphthoate (13b)

The mixture of 0.70 g (1.68 mmol) of (S)-1,1,1-trifluorooctan-2-yl 6-bromo-2-naphthoate, 0.64 g (2.52 mmol) of bis(pinacolato)diboron, 0.495 g of anhydrous KOAc, 0.025 g of $PdCl_2$dppf (0.0336 mmol) in 15 ml of dioxane was degassed and filled with $N_2$, then heated at 85° C. for 16 hours. After cooling down to ambient temperature, product was extracted with ethyl acetate (3x20 ml). The combined organic layers were then washed with water and evaporated to dryness. Residue was purified by flash chromatography on silica gel, eluent Toluene:Hexane (1:1 v/v). Fractions containing the desired product was evaporated to dryness, yielding 0.5 g of 13b (67%) as colourless oil.

Synthesis of bis((S)-1,1,1-trifluorooctan-2-yl) [2,2'-binaphthalene]-6,6'-dicarboxylate (13c)

A degassed solution of 13b (0.5 g, 1.68 mmol), (S)-1,1,1-trifluorooctan-2-yl 6-bromo-2-naphthoate (0.7 g, 1.68 mmol), $PdCl_2$dppf (0.037 g, 0.05 mmol), and SDS (0.2 mg) in a mixture of toluene (20 ml), n-butanol (5 ml), and $H_2O$ (10 ml) was heated to reflux with stirring. Then, a degassed solution of $Na_2CO_3$—$H_2O$ (0.83 g, 6.72 mmol) in 10 ml of water was added. The resulted mixture was refluxed for 3 hours and cooled to ambient temperature. The organic layer was separated and the water layer was extracted with toluene (3x20 ml). The organic extracts were collected, washed with water and evaporated to dryness. The residue was purified by flash chromatography on silica gel with mixture toluene and hexane (1/1). Yield is 0.48 g (46%) as colourless oil.

Example 14

Synthesis of bis((S)-1,1,1-trifluorooctan-2-yl) 6,6'-(1,4-phenylene)bis(2-naphthoate) (14) was carried out in two steps accordingly to the scheme below:

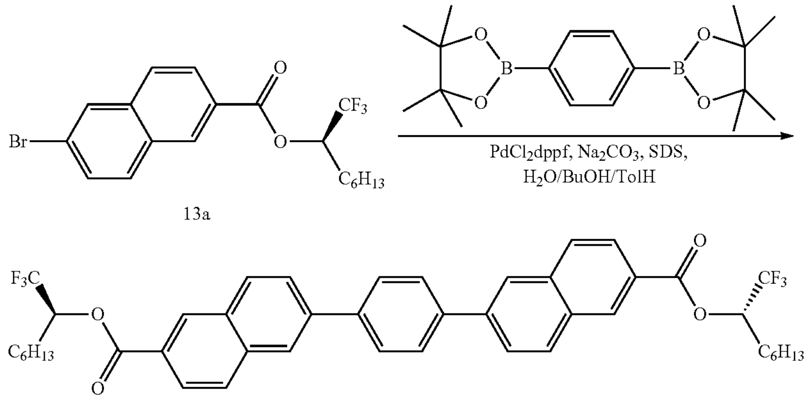

13a

14

A solution of 0.7 g, (1.68 mmol) of compound 13a (see Example 13), 1,4-bis(4,4,5,5-tetramethyl-1,3,2-dioxaborolan-2-yl) benzene (0.253 g, 0.76 mmol), $PdCl_2$dppf (0.035 g, 0.046 mmol), and SDS (0.2 mg) in a mixture of toluene (20 ml), n-butanol (5 ml), and $H_2O$ (10 ml) was degassed in vacuo and flashed with nitrogen for three times followed by heating to reflux with stirring. Then, a degassed solution of $Na_2CO_3$—$H_2O$ (0.754 g, 6.08 mmol) in 10 ml of water was added. The resulted mixture was stirred at reflux for 3 hours and cooled. The organic layer was separated and the water layer was extracted with toluene (3×20 ml). The organic extracts were collected, washed with water and evaporated to dryness. The residue was purified by flash chromatography on silica gel, eluent Toluene:Hexane (1:1 w/w) and recrystallized from acetonitrile. Yield 0.26 g (46%), melting point 135° C.

Example 15

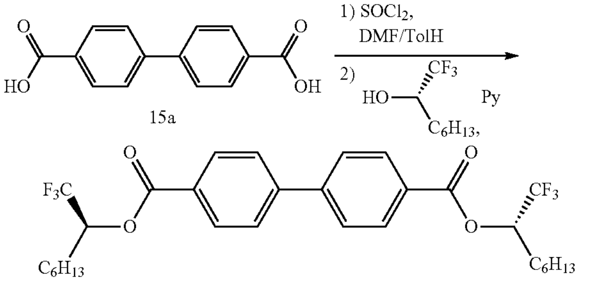

15a

15b

Solution of 0.8 g (3.3 mmol) of 4,4'-biphenyl dicarboxylic acid (15a), 3 drops of DMF in mixture of 10 ml of $SOCl_2$ and 20 ml of toluene for was refluxed for 6 h, then evaporated to dryness. The residual after evaporation was dissolved in 20 ml of dry dioxane, 1.24 g of (S)-1-(trifluoromethyl) heptanol was added, the solution was heated to 50° C. and 3.5 ml of pyridine was added dropwise under stirring. The mixture then was refluxed for 4 hours, evaporated to dryness and purified by flash chromatography on silica gel with mixture hexane-toluene 1:1 v/v. Yield of 15b was 1.18 g (62%) as colourless oil.

Example 16

Synthesis of 4,4"-bis((((S)-1-(trifluoromethyl)heptyl) oxy)methyl)-1,1':4',1"-terphenyl (16b) was carried out accordingly to the following scheme:

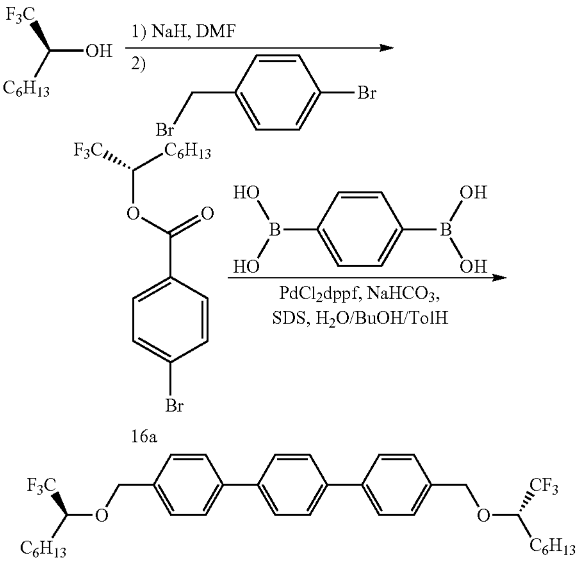

16a

16b

Synthesis of (S)-1-bromo-4-(((1,1,1-trifluorooctan-2-yl) oxy)methyl)benzene (16a). To the mixture of 0.382 g (9.56 mmol) of NaH (60% suspension in oil) in 15 ml of dry DMF under in $N_2$ atmosphere 1.17 g (6.37 mmol) of (S)-1-(trifluoromethyl)heptanol was added at 25° C. and stirred for 4 hours. Then, a solution of 1.75 g (7.01 mmol) of 1-bromo-4-(bromomethyl)benzene in 9 ml of dry DMF was added and stirred for 28 hours. Then mixture was diluted with cold 3% aqueous AcOH, extracted with DCM, washed with water, dried over $Na_2SO_4$. Drying agent was filtered off and solution in DCM was evaporated to dryness. The crude product was purified with flash chromatography on silica gel/hexane furnishing 2.106 g (94%) of 16a as a colourless oil used on the next step without additional purification.

Synthesis of 4,4"-bis((((S)-1-(trifluoromethyl)heptyl) oxy)methyl)-1,1':4',1"-terphenyl (16b) was carried out according to protocol described in Example 1 stage b. Quantities: 2.0 g (5.7 mmol) of (S)-1-bromo-4-(((1,1,1-trifluorooctan-2-yl)oxy)methyl)-benzene (16a); 0.425 g (2.57 mmol) of 1,4-phenylenediboronic acid; yield of desired product 16b was 0.516 g (32%) as a colourless solid.

Example 17-22 disclose the compositions of LC mixtures used as achiral hosts.

Example 17

TABLE 1

| Host mixture BPP-2 | |
|---|---|
| Components | Content of the component, mol. % |
| 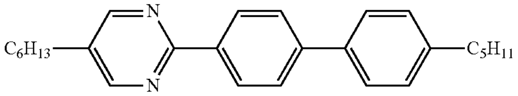 | 73.7 |
| 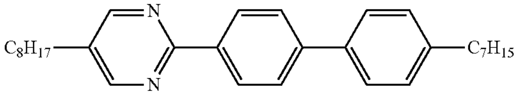 | 26.3 |

Mixture BPP-2 showed the following phase transitions:

$$Cr \xrightarrow{36} SmC \xleftarrow{99} N \xleftarrow{159} Iso$$

Example 18

TABLE 2

| Host mixture BPP-3. | |
|---|---|
| Components | Content of the component, mol. % |
| 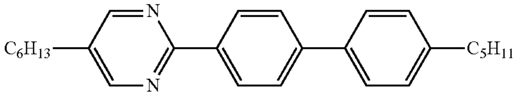 | 50 |
| 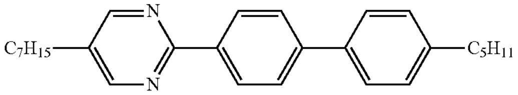 | 20 |
| 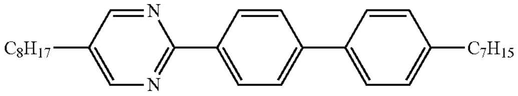 | 30 |

Mixture BPP-3 showed the following phase transitions:

$$Cr \xrightarrow{28.2} SmC \xleftarrow{104.6} N \xleftarrow{157.2} Iso$$

Example 19
TABLE 3
| Host mixture BPP-4. | |
|---|---|
| Components | Content of the component, mol. % |
| 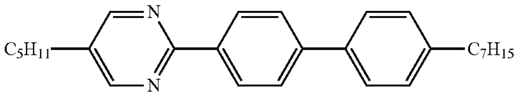 | 17.7 |
| 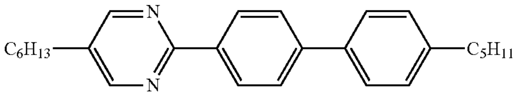 | 40.1 |
| 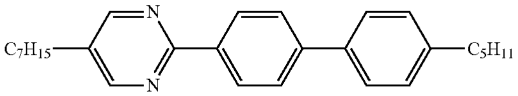 | 18.2 |
| 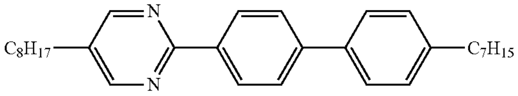 | 24 |
Mixture BPP-4 showed the following phase transitions:
$$\mathrm{Cr} \xrightarrow{21.6} \mathrm{SmC} \xleftarrow{102,7} \mathrm{N} \xleftarrow{160,4} \mathrm{Iso}$$
Example 20
TABLE 4
| Host mixture BPP-6. | |
|---|---|
| Components | Content of the component, mol. % |
| 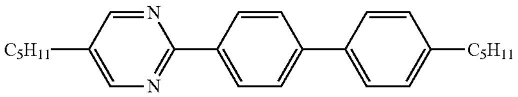 | 4.0 |
| 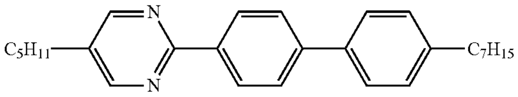 | 5.0 |
| 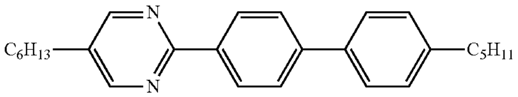 | 49.5 |
| 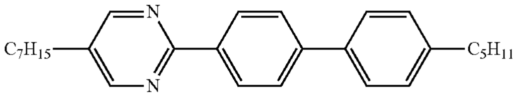 | 19.8 |
| 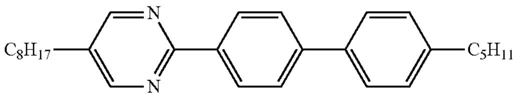 | 2.0 |

TABLE 4-continued

| Host mixture BPP-6. | |
|---|---|
| Components | Content of the component, mol. % |
| 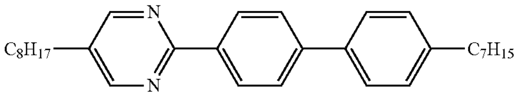 | 19.8 |

Mixture BPP-6 showed the following phase transitions:

$$\mathrm{Cr} \xrightarrow{20.8} \mathrm{SmC} \xleftarrow{99} \mathrm{N} \xleftarrow{161} \mathrm{Iso}$$

Example 21

TABLE 5

| Host mixtures of the three laterally fluorinated dialkylterphenyls (DFT). | |
|---|---|
| Components | Content of the component, mol. % |
| 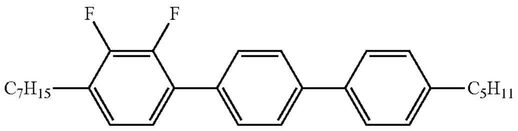 | 25 |
| 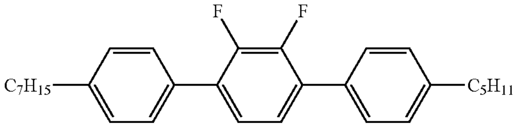 | 50 |
| 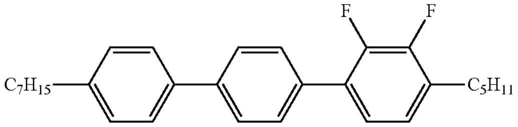 | 25 |

Mixture DFT showed the following phase transitions:

$$\mathrm{Cr} \xrightarrow{14} \mathrm{SmC} \xleftarrow{91} \mathrm{SmA} \xleftarrow{98} \mathrm{N} \xleftarrow{125} \mathrm{Iso}$$

Example 22

TABLE 6

| Host mixture PP-7. | |
|---|---|
| Components | Content of the component, mol. % |
| 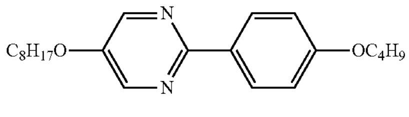 | 37.5 |
| 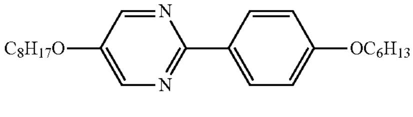 | 37.5 |

TABLE 6-continued

| Host mixture PP-7. | |
|---|---|
| Components | Content of the component, mol. % |
| 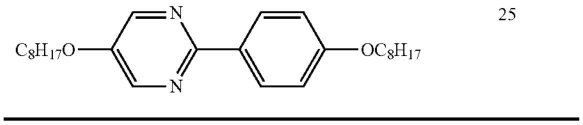 | 25 |

Mixture PP-7 showed the following phase transitions:

$$\mathrm{Cr} \xrightarrow{20.3} \mathrm{SmC} \xleftarrow{82.4} \mathrm{SmC} \xleftarrow{94.9} \mathrm{N} \xleftarrow{97.5} \mathrm{Iso}$$

Resuming, the multicomponent mixtures of biphenylpy-rimi dines (BPP-4 and BPP-6) and DFT mixture show wide enough range of desired SmC phase from ~13-20 to 91-103° C., thus they are suitable as a achiral host. Whereas BPP-2 and BPP-3 have higher melting points, 28° C. and 36° C. respectively, which make them an appropriate medium only for express comparison of chiral components.

Example 23-Example 55 disclose the compositions of FLC mixtures of chiral components (compounds of type I) with achiral hosts and their properties.

Example 23

TABLE 7

Composition of FLC-3-1 mixture.

| Components | Content of the component, mol. % |
|---|---|
| BPP-3 | 76.0 |
| 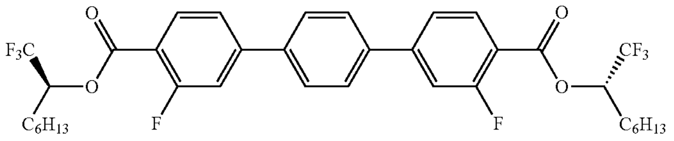 | 24.0 |

TABLE 8

Properties of FLC-3-1 mixture (at 25° C.).

| Phase transitions | Cr $\xrightarrow{12.5}$ SmC* $\xleftarrow{104}$ N* $\xleftarrow{118}$ Iso |
|---|---|
| Tilt angle, θ, degree | 38 |
| Spontaneous polarization, $P_S$, nC/cm$^2$ | 174 |
| Switching time, $\tau_{ON}$, μs | 380 |
| Helix pitch, $p_0$, nm | 99 |
| Critical voltage of helix unwinding, $V_C$, V | 4.6 |

The FLC-3-1 shows parameters that are close to optimal ones.

Example 24

TABLE 9

Composition of FLC-3-2 mixture.

| Components | Content of the component, mol. % |
|---|---|
| BPP-3 | 85.6 |
| 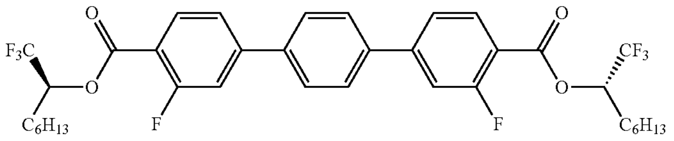 | 14.4 |

TABLE 10

The properties of FLC-3-2 mixture (at 25° C.).

| Phase transitions | Cr $\xrightarrow{<20}$ SmC* $\xleftarrow{112}$ SmA $\xleftarrow{115}$ N* $\xleftarrow{129}$ Iso |
|---|---|
| Tilt angle, θ, degree | 36.5—below optimal value |
| Spontaneous polarization, $P_S$, nC/cm$^2$ | 93.4—close to lowest margin |
| Helix pitch, $p_0$, nm | 154—over the optimal value |
| Critical voltage of helix unwinding, $V_C$, V | 5.0 |

The mixture FLC-3-2 shows lowest margin of Chiral component concentration.

Example 25

TABLE 11

| The composition of FLC-3-3 mixture. | |
|---|---|
| Components | Content of the component, mol. % |
| BPP-3 | 86.1 |
| 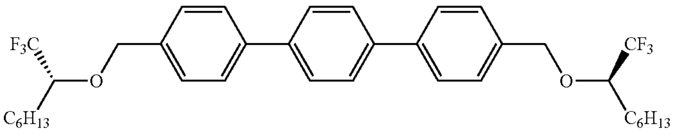 | 23.9 |

TABLE 12

| The properties of FLC-3-3 mixture (at 25° C.). | |
|---|---|
| Phase transitions | Cr $\xrightarrow{22}$ SmC* $\xleftarrow{72}$ SmA $\xleftarrow{84}$ TGBA* $\xleftarrow{100}$ N* $\xleftarrow{112}$ Iso |
| Helix pitch, $p_0$, nm | 145-over the optimal value |
| Tilt angle, $\theta$, degree | 35-below optimal value |
| Spontaneous polarization, $P_S$, nC/cm$^2$ | 92-below optimal value |
| Switching time, $\tau_{ON}$, μs | 80 |
| Critical voltage of helix unwinding, $V_c$, V | 5.8 |

The effect of variation of linker type between central core and terminal chiral group.

The mixture shows not good alignment in the FLC cell.

Example 26

TABLE 13

| The composition of FLC-3-4 mixture. | |
|---|---|
| Components | Content of the component, mol. % |
| BPP-3 | 84.1 |
| 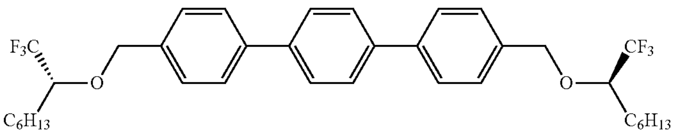 | 15.9 |

TABLE 14

| The properties of FLC-3-4 mixture (at 25° C.). | |
|---|---|
| Phase transitions | Cr $\xrightarrow{22}$ SmC* $\xleftarrow{88}$ SmA $\xleftarrow{125}$ N* $\xleftarrow{130}$ Iso |
| Helix pitch, $p_0$, nm | 218-over the optimal value |
| Tilt angle, $\theta$, degree | 38.5 |
| Spontaneous polarization, $P_S$, nC/cm$^2$ | 100-below optimal value |
| Switching time, $\tau_{ON}$, μs | 80 |
| Critical voltage of helix unwinding, $V_c$, V | 5.8 |

The mixture shows the effect of variation of linker type between central core and terminal chiral group. Mixture shows not good alignment in the FLC cell.

Example 27

TABLE 15

The composition of FLC-3-5 mixture.

| Components | Content of the component, mol. % |
|---|---|
| BPP-3 | 76 |
| 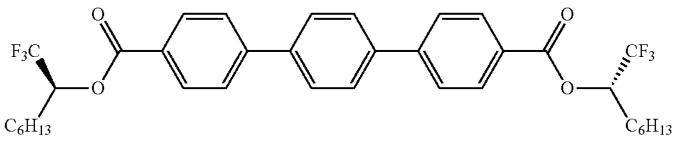 | 24 |

TABLE 16

The properties of FLC-3-5 mixture (at 25° C.).

| Phase transitions | Cr $\xrightarrow{14,6}$ SmC* $\xleftarrow{99.5}$ SmA $\xleftarrow{115}$ N* $\xleftarrow{118}$ Iso |
|---|---|
| Tilt angle, θ, degree | 36.5-below optimal value |
| Spontaneous polarization, $P_S$, nC/cm$^2$ | 146 |
| Switching time, $\tau_{ON}$, μs | 390-slower than required value |
| Helix pitch, $p_0$, nm | 112 |
| Critical voltage of helix unwinding, $V_c$, V at 90 Hz | 4.5 |

Comparative example showing results with known chiral component.

Example 28

TABLE 17

The composition of FLC-4-1 mixture.

| Components | Content of the component, mol. % |
|---|---|
| BPP-4 | 85.0 |
| 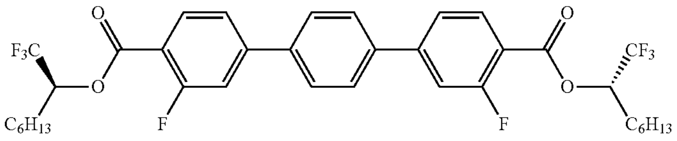 | 25.0 |

TABLE 18

The properties of FLC-4-1 mixture (at 25° C.).

Figure 2:
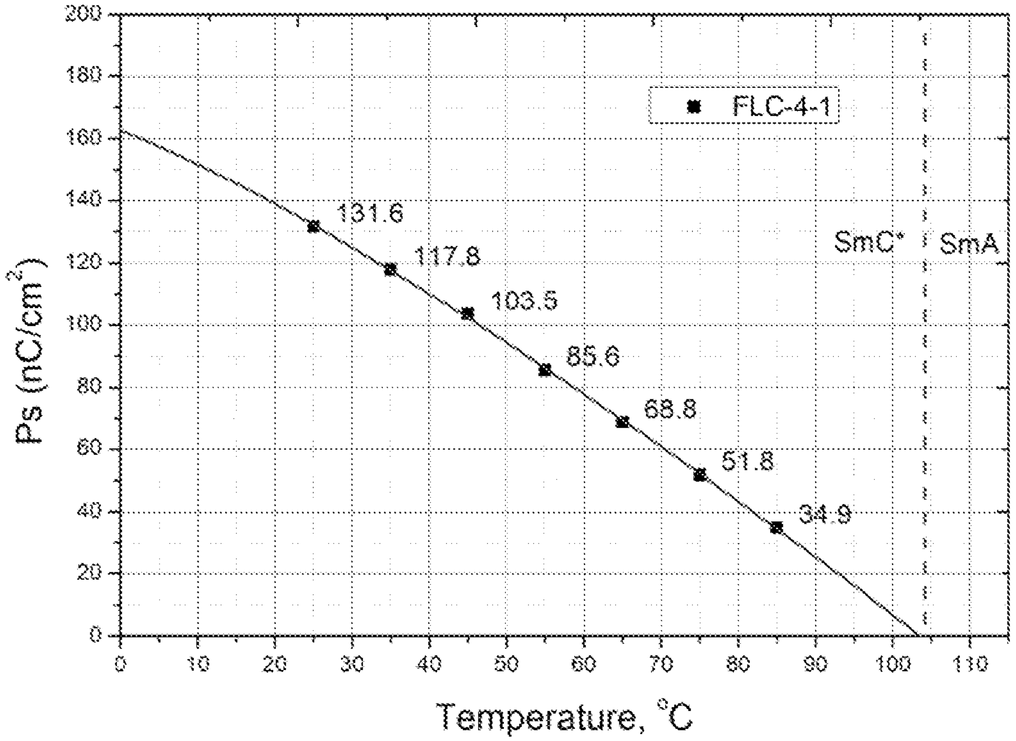
FIG. 2 shows temperature dependence of spontaneous polarization for the mixture FLC-4-1. The vertical dotted line denoted the temperature of the phase transition SmC*→SmA in absence of external electric field.
Figure 3:
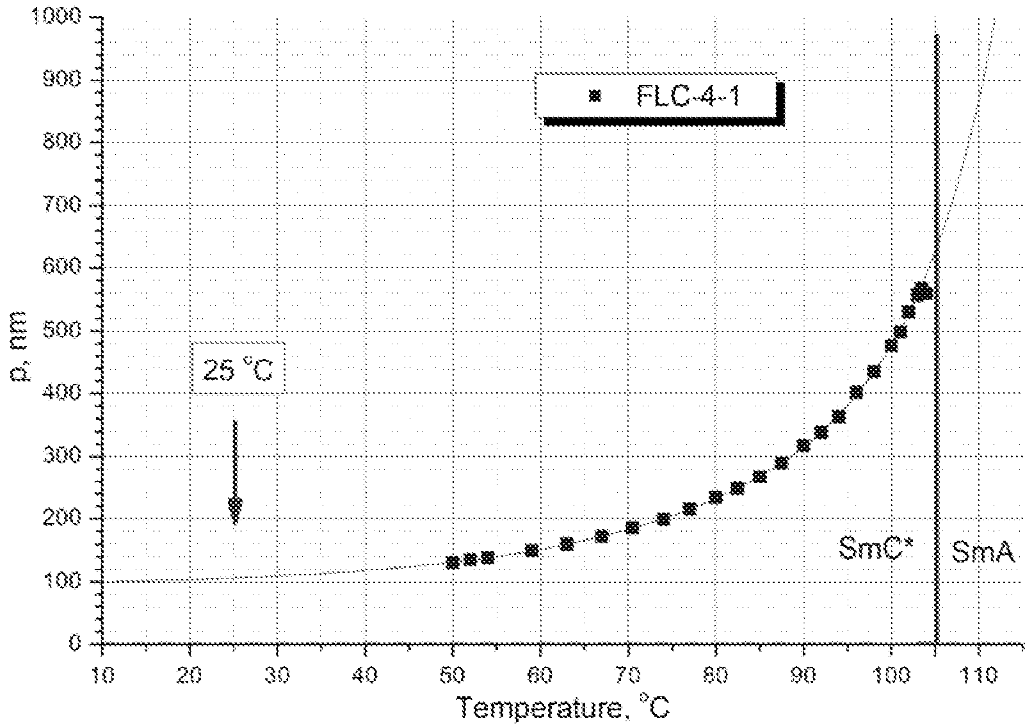
FIG. 3 shows temperature dependence of the helix pitch for the mixture FLC-4-1. The vertical bold line denoted the temperature of the phase transition SmC*→SmA in absence of external electric field.
Figure 4:
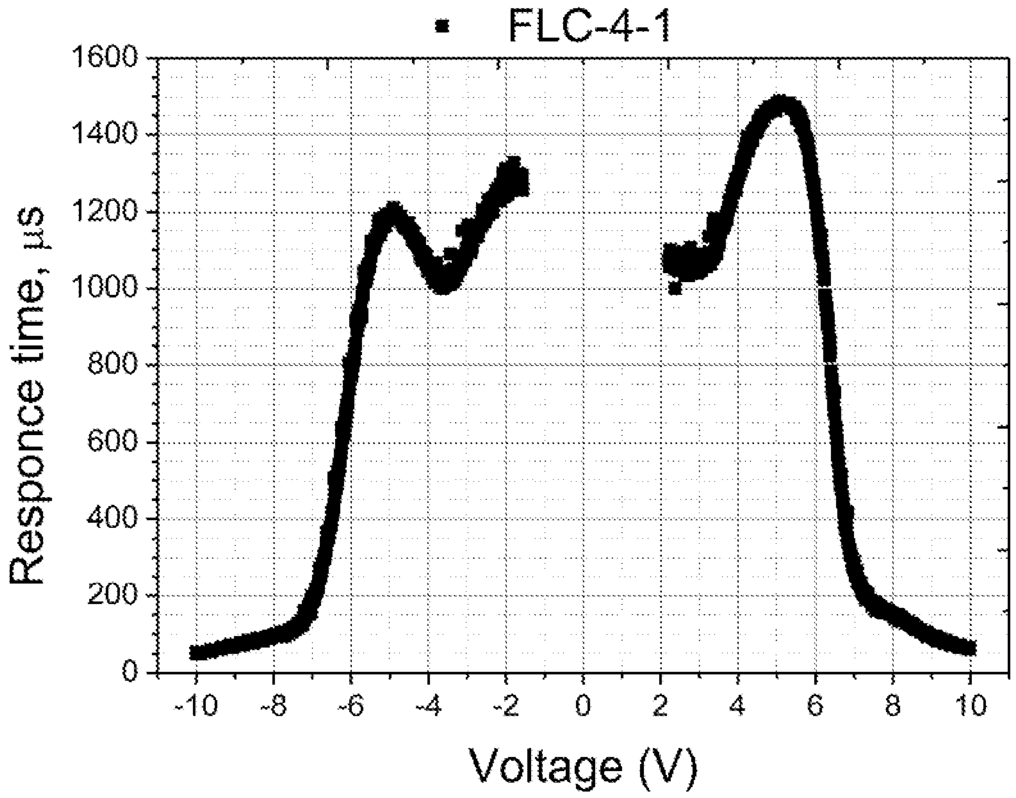
FIG. 4 shows dependence of response time, $\tau_{ON}$ at 90 Hz, FLC-4-1, at 25° C., cell gap 1.6 μm.

| Phase transitions | Cr $\xrightarrow{10}$ SmC* $\xleftarrow{104.6}$ SmA $\xleftarrow{114}$ Iso |
|---|---|
| Helix pitch, $p_0$, nm (FIG. 3) | 107 |
| Tilt angle, θ, degree (FIG. 1) | 40 |
| Critical voltage of helix unwinding, $V_c$, V at 90 Hz | 8.8 |
| Spontaneous polarization, $P_S$, nC/cm$^2$ (FIG. 2) | 131.6 |
| Response time, $\tau_{ON}$, μs (FIG. 4) | 50 |

The FLC-4-1 shows parameters that are close to optimal values.

Example 29

FLC-4-2 Composition

TABLE 19

The composition of FLC-4-2 mixture.

| Components | Content of the component, mol. % |
| --- | --- |
| BPP-4 | 83.0 |
| 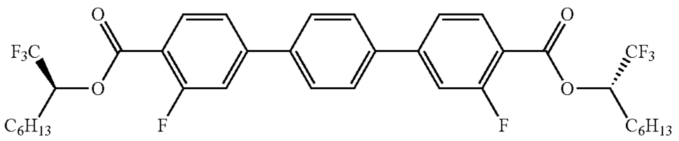 | 17 |

TABLE 20

The properties of FLC-4-2 mixture (at 25° C.).

| Phase transitions | $\mathrm{Cr} \xrightarrow{13.3} \mathrm{SmC^*} \xleftarrow{105} \mathrm{SmA} \xleftarrow{120} \mathrm{Iso}$ |
| --- | --- |
| Helix pitch, $p_0$, nm | 133 |
| Tilt angle, θ, degree | 38.5 |
| Critical voltage of helix unwinding, $V_c$, V at 10 Hz | 4 |
| Spontaneous polarization, $P_S$, nC/cm$^2$ | 77.4 |
| Switching on time, $\tau_{ON}$, μs | 33 |

The mixture FLC-4-2 used for determination of lowest margin of chiral component concentration with acceptable set of properties.

Example 30

TABLE 21

The composition of FLC-4-3 mixture.

| Components | Content of the component, mol. % |
| --- | --- |
| BPP-4 | 85.0 |
| 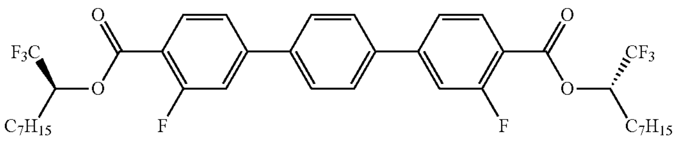 | 25.0 |

TABLE 22

The properties of FLC-4-3 mixture (at 25° C.).

| Phase transitions | $\mathrm{Cr} \xrightarrow{10} \mathrm{SmC^*} \xleftarrow{104.6} \mathrm{SmA} \xleftarrow{114} \mathrm{Iso}$ |
| --- | --- |
| Helix pitch, $p_0$, nm | 95 |
| Tilt angle, θ, degree | 38 |
| Critical voltage of helix unwinding, $V_c$, V at 90 Hz | 10.1 |

TABLE 22-continued

| The properties of FLC-4-3 mixture (at 25° C.). | |
|---|---|
| Phase transitions | Cr $\xrightarrow{10}$ SmC* $\xleftarrow{104.6}$ SmA $\xleftarrow{114}$ Iso |
| Spontaneous polarization, $P_S$, nC/cm$^2$ | 126 |
| Switching on time, $\tau_{ON}$, μs | 55 |

Examples shows effect of the length of terminal alkyl chain, c.f. with Example 28

Example 31

TABLE 23

| The composition of FLC-4-4 mixture. | |
|---|---|
| Components | Content of the component, mol. % |
| BPP-4 | 85.0 |
| 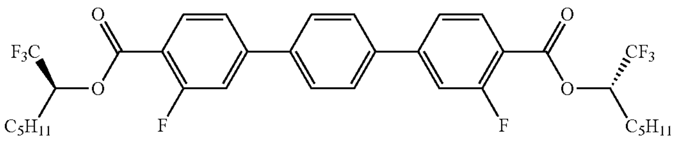 | 25.1 |

TABLE 24

| The properties of FLC-4-4 mixture (at 25° C.). | |
|---|---|
| Phase transitions | Cr $\xrightarrow{10}$ SmC* $\xleftarrow{104.6}$ SmA $\xleftarrow{114}$ Iso |
| Helix pitch, $p_0$, nm | 119 |
| Tilt angle, θ, degree | 39.5 |
| Critical voltage of helix unwinding, $V_c$, V at 10 Hz | 8.2 |
| Spontaneous polarization, $P_S$, nC/cm$^2$ | 131 |
| Switching on time, $\tau_{ON}$, μs | 51 |

Examples shows effect of the length of terminal alkyl chain, c.f. with Example 28.

Example 32

TABLE 25

| The composition of FLC-4-5 mixture. | |
|---|---|
| Components | Content of the component, mol. % |
| BPP-4 | 84.8 |
| 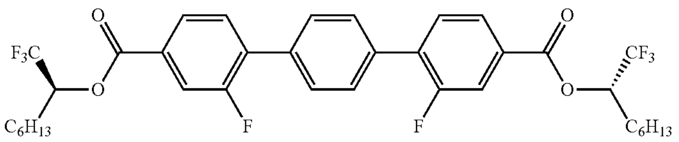 | 25.2 |

TABLE 26

| The properties of FLC-4-5 mixture (at 25° C.). | |
|---|---|
| Phase transitions | Cr $\xrightarrow{12}$ SmC* $\xleftarrow{99}$ SmA $\xleftarrow{110}$ Iso |
| Helix pitch, $p_0$, nm | 105 |
| Tilt angle, θ, degree | 36-below optimal value |
| Critical voltage of helix unwinding, $V_c$, V at 90 Hz | 9.1 |
| Spontaneous polarization, $P_S$, nC/cm$^2$ | 120 |
| Switching on time, $\tau_{ON}$, μs | 55 |

The example shows the effect of moving polar groups in the central core of the chiral component molecules towards their centre, c.f. with Example 28.

Example 33

TABLE 27

| The composition of FLC-4-6 mixture. | |
|---|---|
| Components | Content of the component, mol. % |
| BPP-4 | 85.1 |
| 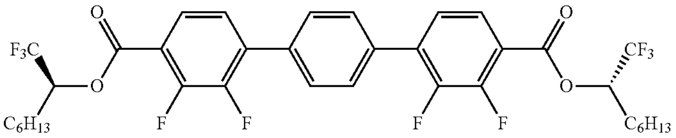 | 24.9 |

TABLE 28

| The properties of FLC-4-6 mixture (at 25° C.). | |
|---|---|
| Phase transitions | Cr $\xrightarrow{11}$ SmC* $\xleftarrow{95}$ SmA $\xleftarrow{105}$ Iso |
| Helix pitch, $p_0$, nm | 97 |
| Tilt angle, θ, degree | 35—below optimal value |
| Critical voltage of helix unwinding, $V_c$, V at 90 Hz | 9.9 |
| Spontaneous polarization, $P_S$, nC/cm$^2$ | 152 |
| Switching on time, $\tau_{ON}$, μs | 64 |

The example shows the effect of moving polar groups in the central core of the chiral component molecules towards their centre on tilt angle, c.f. with Example 28.

Example 34

TABLE 29

| The composition of FLC-4-7 mixture. | |
|---|---|
| Components | Content of the component, mol. % |
| BPP-4 | 75.0 |
| 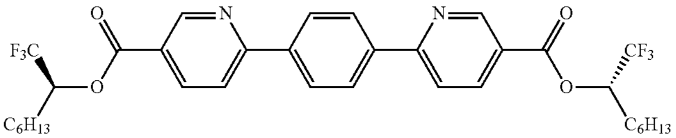 | 25.0 |

TABLE 30

Figure 5:
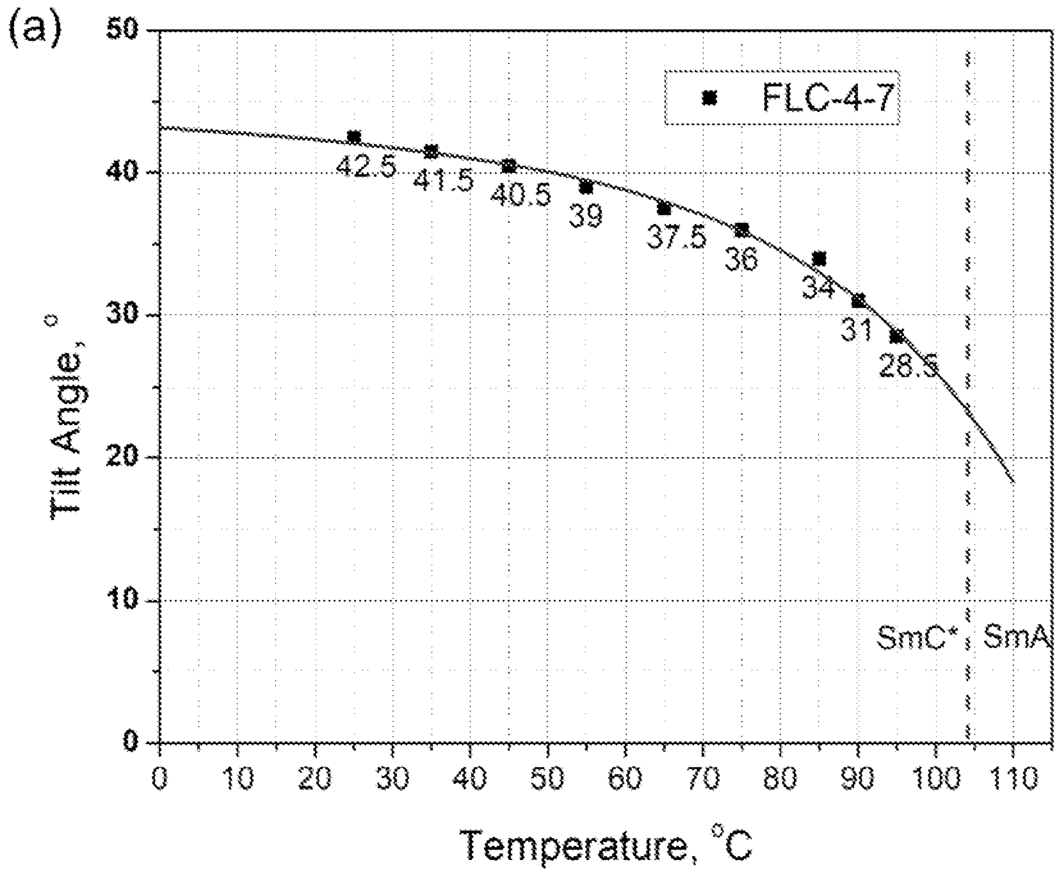
FIG. 5 shows (a) temperature dependence of tilt angle for the mixture FLC-4-7, where the vertical dotted line denotes the temperature of the phase transition SmC*→SmA in absence of external electric field, (b) temperature dependence of spontaneous polarization for the mixture FLC-4-7, where the vertical dotted line denotes the temperature of the phase transition SmC*→SmA in absence of external electric field, (c) temperature dependence of the helix pitch (p0) for the mixture FLC-4-7, where the vertical dotted line denotes the temperature of the phase transition SmC*→SmA in absence of external electric field.
Figure 5:
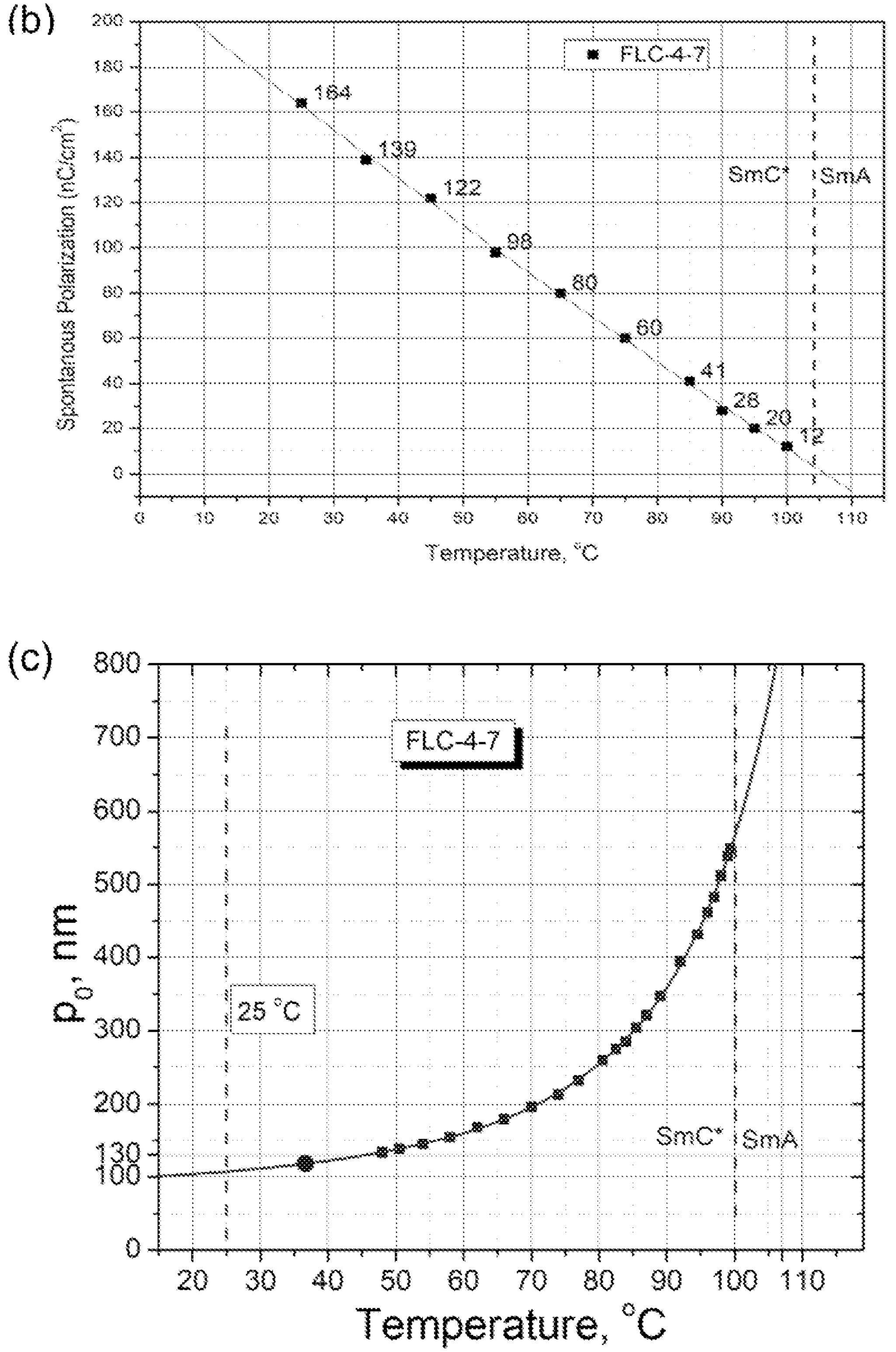
Figure 6:
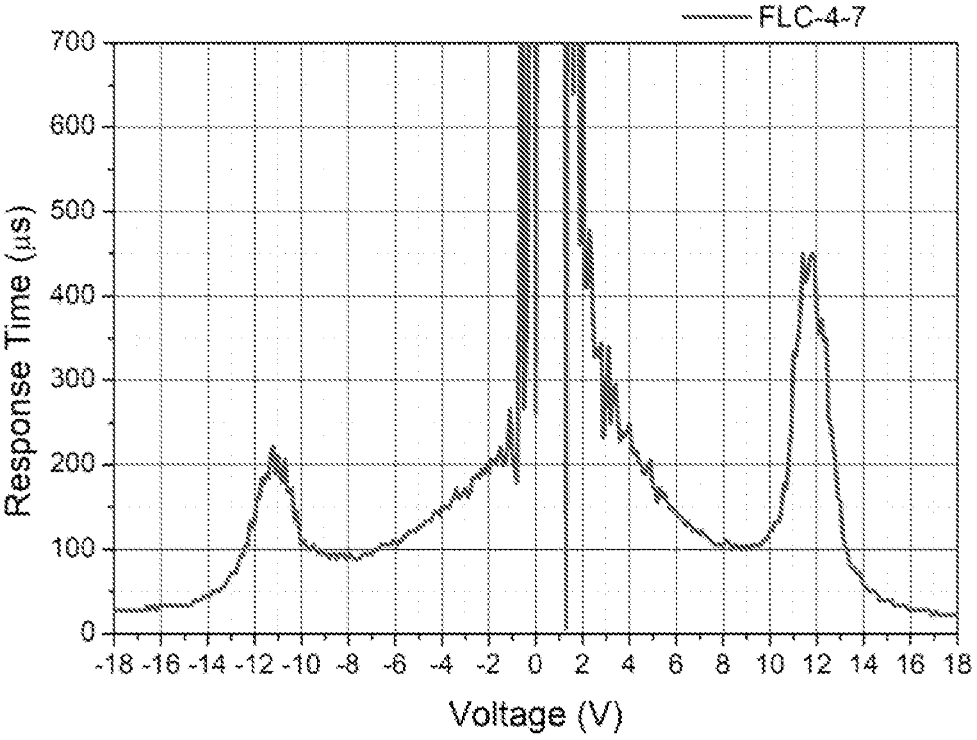
FIG. 6 shows dependence of response time, $\tau_{ON}$ at 90 Hz, for mixture FLC-4-7 at 25° C., cell gap 1.6 μm.

| The properties of FLC-4-7 mixture (at 25° C.). | |
|---|---|
| Phase transitions | Cr $\xrightarrow{12}$ SmC* $\xleftarrow{99.8}$ SmA $\xleftarrow{107}$ Iso |
| Helix pitch, $p_0$, nm (FIG. 5c)) | 106.8 |
| Tilt angle, θ, degree (FIG. 5(a)) | 42.5 |
| Critical voltage of helix unwinding, $V_c$, V at 90 Hz | 11.2 |
| Spontaneous polarization, $P_S$, nC/cm$^2$ (FIG. 5(b)) | 164 |
| Response time at 8 V, $\tau_{ON}$, μs (FIG. 6) | 90 |

Example 35

TABLE 31

The composition of FLC-4-8 mixture.

| Components | Content of the component, mol % |
|---|---|
| BPP-4 | 75.0 |
| 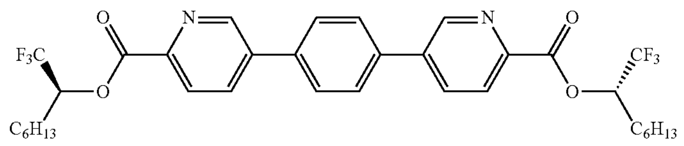 | 25.0 |

TABLE 32

| The properties of FLC-4-8 mixture (at 25° C.). | |
|---|---|
| Phase transitions | Cr $\xrightarrow{13}$ SmC* $\xleftarrow{97}$ SmA $\xleftarrow{105}$ Iso |
| Helix pitch, $p_0$, nm | 95 |
| Tilt angle, θ, degree | 43 |
| Critical voltage of helix unwinding, $V_c$, V at 90 Hz | 11.9 |
| Spontaneous polarization, $P_S$, nC/cm$^2$ | 180 |
| Switching on time at 10 V, $\tau_{ON}$, μs | 80 |

Example 36

TABLE 33

The composition of FLC-4-9 mixture.

| Components | Content of the component, mol. % |
|---|---|
| BPP-4 | 75.1 |
| 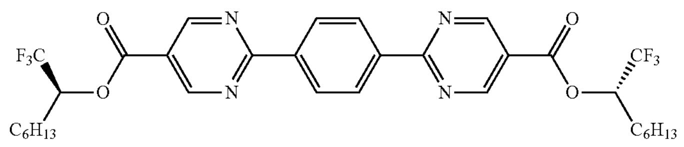 | 24.9 |

TABLE 34

| The properties of FLC-4-9 mixture (at 25° C.). | |
|---|---|
| Phase transitions | Cr $\xrightarrow{14}$ SmC* $\xleftarrow{95}$ SmA $\xleftarrow{103}$ Iso |
| Helix pitch, $p_0$, nm | 105 |
| Tilt angle, θ, degree | 41.5 |
| Critical voltage of helix unwinding, $V_c$, V at 90 Hz | 10.5 |
| Spontaneous polarization, $P_S$, nC/cm$^2$ | 144 |
| Switching time at 10 V, $\tau_{ON}$, μs | 78 |

Example 37

TABLE 35

The composition of FLC-4-10 mixture.

| Components | Content of the component, mol. % |
|---|---|
| BPP-4 | 75.0 |
| 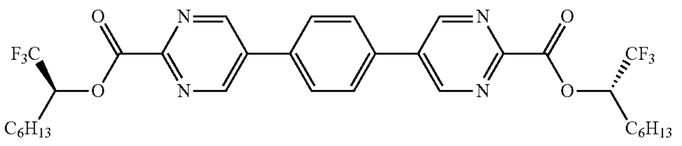 | 25.0 |

TABLE 36

| The properties of FLC-4-10 mixture (at 25° C.). | |
|---|---|
| Phase transitions | Cr $\xrightarrow{13}$ SmC* $\xleftarrow{97}$ SmA $\xleftarrow{105}$ Iso |
| Helix pitch, $p_0$, nm | 95 |
| Tilt angle, θ, degree | 43 |
| Critical voltage of helix unwinding, $V_c$, V at 90 Hz | 11.5 |
| Spontaneous polarization, $P_S$, nC/cm$^2$ | 180 |
| Switching on time at 10 V, $\tau_{ON}$, μs | 80 |

Example 38

TABLE 37

The composition of FLC-4-11 mixture.

| Components | Content of the component, mol. % |
|---|---|
| BPP-4 | 75.0 |
| 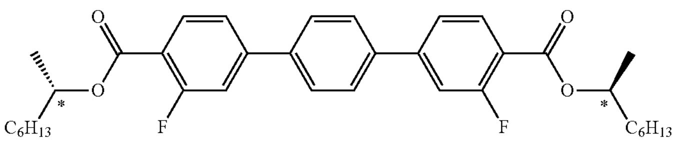 | 25.0 |

TABLE 38

| The properties of FLC-4-11 mixture (at 25° C.). | |
|---|---|
| Phase transitions | $\mathrm{Cr} \xrightarrow{8.3} \mathrm{SmC^*} \xleftarrow{107} \mathrm{SmA} \xleftarrow{117} \mathrm{N^*} \xleftarrow{119} \mathrm{Iso}$ |
| Helix pitch, $p_0$, nm | 165—over the optimal value |
| Tilt angle, θ, degree | 33.8—below optimal value |
| Critical voltage of helix unwinding, $V_c$, V at 90 Hz | 5.8 |
| Spontaneous polarization, $P_S$, nC/cm$^2$ | 54—below optimal value |
| Switching on time at 10 V, $\tau_{ON}$, μs | 78 |

The example shows an importance of highly polar group (like $CF_3$, in FLC-4-1, see Example 28) at chiral centre: its changing with non-polar $CH_3$ one reduces spontaneous polarization ~2.4 times and HTP by ~1.6 times (compare with Example 28)

Example 39. Comparative Example

TABLE 39

| The composition of FLC-4-12 mixture. | |
|---|---|
| Components | Content of the component, mol. % |
| BPP-4 | 82.9 |
| 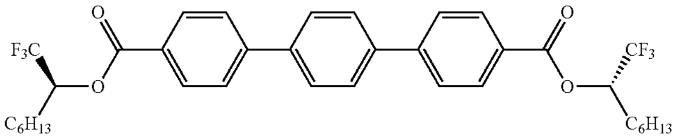 | 17.1 |

TABLE 40

| The properties of FLC-4-12 mixture (at 25° C.). | |
|---|---|
| Phase transitions | $\mathrm{Cr} \xrightarrow{13.2} \mathrm{SmC} \xleftarrow{100} \mathrm{SmA} \xleftarrow{119.3} \mathrm{Iso}$ |
| Helix pitch, $p_0$, nm | 136 |
| Tilt angle, θ, degree | 35.5—below optimal value |
| Critical voltage of helix unwinding, $V_c$, V, at 90 Hz | 5.4 |
| Spontaneous polarization, $P_S$, nC/cm$^2$ | 66.2—below optimal value |
| Switching on time, $\tau_{ON}$, μs | 50 |

Comparative example showing results with known chiral component. The example shows the effect of moving polar groups in the central core of the chiral component molecules towards their centre on tilt angle, c.f. with Example 29.

Example 40 Comparative Example

TABLE 41

| The composition of FLC-4-13 mixture. | |
|---|---|
| Components | Content of the component, mol. % |
| BPP-4 | 75 |
| 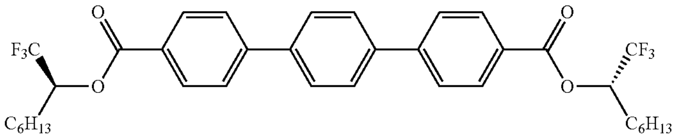 | 25 |

TABLE 42

| The properties of FLC-4-13 mixture (at 25° C.). | |
|---|---|
| Phase transitions | Cr $\xrightarrow{10.6}$ SmC* $\xleftarrow{96}$ SmA $\xleftarrow{111.2}$ Iso |
| Helix pitch, $p_0$, nm | 112 |
| Tilt angle, θ, degree | 36—below optimal value |
| Critical voltage of helix unwinding, $V_c$, V at 10 Hz | 7.3 |
| Spontaneous polarization, $P_S$, nC/cm$^2$ | 96.2—close to lowest margin |
| Switching on time, $\tau_{ON}$, μs | 80 |

Comparative example showing results with known chiral component. The example shows the effect of moving polar groups in the central core of the chiral component molecules towards their centre on tilt angle, c.f. with Example 28.

Example 41 Comparative Example

TABLE 43

| The composition of FLC-4-14 mixture. | |
|---|---|
| Components | Content of the component, mol. % |
| BPP-4 | 75.1 |
| 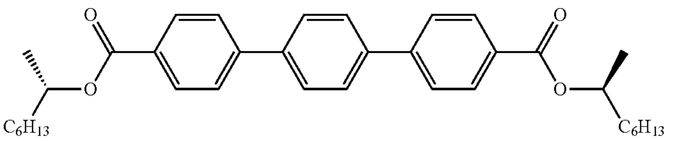 | 24.9 |

TABLE 44

| The properties of FLC-4-14 mixture (at 25° C.). | |
|---|---|
| Phase transitions | Cr $\xrightarrow{10}$ SmC* $\xleftarrow{106}$ SmA $\xleftarrow{121}$ N* $\xleftarrow{123}$ Iso |
| Helix pitch, $p_0$, nm | 233—over the optimal value |
| Tilt angle, θ, degree | 30.5—below optimal value |
| Critical voltage of helix unwinding, $V_c$, V at 10 Hz | 5.6 |
| Spontaneous polarization, $P_S$, nC/cm$^2$ | 109.8—close to lowest margin |
| Switching on time at 10 V, $\tau_{ON}$, μs | 78 |

Comparative example showing results with known chiral component.

The example shows:

- an importance of highly polar group at chiral centre (like $CF_3$, in FLC-4-1, see Example 28): its changing with non-polar $CH_3$ reduces spontaneous polarization ~1.2 times.
- Effect of polar group in the central core of the molecule on tilt angle, c.f. with Example 28

Example 42

TABLE 45

| The composition of FLC-4-15 mixture. | |
|---|---|
| Components | Content of the component, mol. % |
| BPP-4 | 75.2 |
| 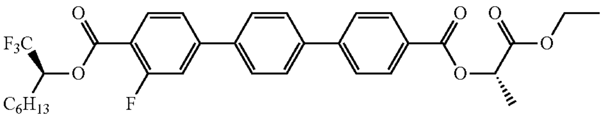 | 24.8 |

TABLE 46

| The properties of FLC-4-15 mixture (at 25° C.). | |
|---|---|
| Phase transitions | $Cr \xrightarrow{10} SmC^* \xleftarrow{106} SmA \xleftarrow{121} N^* \xleftarrow{122.7} Iso$ |
| Helix pitch, $p_0$, nm | 240—over the optimal value |
| Tilt angle, θ, degree | 34.5—below optimal value |
| Critical voltage of helix unwinding, $V_c$, V, at 10 Hz | 4.8 |
| Spontaneous polarization, $P_S$, $nC/cm^2$ | 181 |
| Switching on time at 10 V, $\tau_{ON}$, μs | 52 |

Examples shows an effect of the type of terminal chiral units. Obviously, two different chiral units induce the same sign of $P_S$ (high value) and opposite sign of HTP (helix is unwounded to 240 nm), c.f. with Example 28.

Example 43

TABLE 47

| The composition of FLC-4-16 mixture. | |
|---|---|
| Components | Content of the component, mol. % |
| BPP-4 | 86 |
| 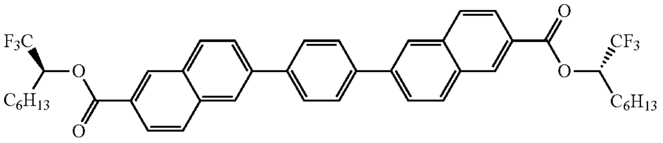 | 14 |

TABLE 48

| The properties of FLC-4-16 mixture (at 25° C.). | |
|---|---|
| Phase transitions | $Cr \xrightarrow{29} SmC^* \xleftarrow{92} SmA \xleftarrow{114} N^* \xleftarrow{139} Iso$ |
| Helix pitch, $p_0$, nm | 480—over the optimal value |
| Tilt angle, θ, degree | 32—below optimal value |
| Spontaneous polarization, $P_S$, $nC/cm^2$ | 92—below optimal value |

The example shows an effect of the nature and length of the central core in the chiral component, c.f. with Example 28. Due to high melting point, the chiral component is insufficiently soluble in the Host, even at 14 mol. % the melting point of the mixture increases to 29° C. Additionally, the tilt angle is too low, apparently due to notably longer molecule in the chiral component than in the Host.

Example 44

TABLE 49

| The composition of FLC-4-17 mixture. | |
|---|---|
| Components | Content of the component, mol. % |
| BPP-4 | 80 |
| 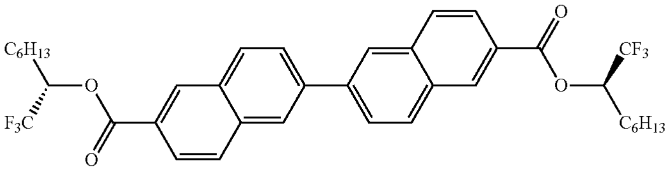 | 20 |

TABLE 50

| The properties of FLC-4-17 mixture (at 25° C.). | |
|---|---|
| Phase transitions | Cr $\xrightarrow{13.3}$ SmC* $\xleftarrow{75}$ SmA $\xleftarrow{100}$ N* $\xleftarrow{108}$ Iso |
| Helix pitch, $p_0$, nm | 348—over the optimal value |

The example shows an effect of the nature and length of the central core in the chiral component, c.f. with Example 28. As the molecules of Chiral components are shorter than that in the Host, the HTP is reduced and induced helix pitch is too large. The Chiral component is also not well compatible with the Host that resulted in reducing of $T_{SmC*}$ to 75° C.

Example 45

TABLE 51

The composition of FLC-4-18 mixture.

| Components | Content of the component, mol. % |
|---|---|
| BPP-4 | 80 |
| 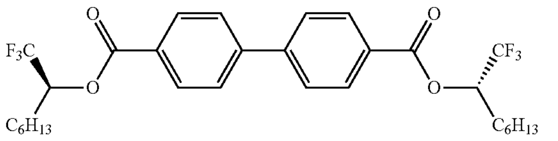 | 20 |

TABLE 52

| The properties of FLC-4-18 mixture (at 25° C.). | |
|---|---|
| Phase transitions | Cr $\xrightarrow{8}$ SmC* $\xleftarrow{32}$ SmA $\xleftarrow{61}$ N* $\xleftarrow{77}$ Iso |
| Helix pitch, $p_0$, nm | 650—over the optimal value |

The example shows an effect of the nature and length of the central core in the chiral component, c.f. with Example 28. Obviously, due to molecules of chiral components are shorter than that in the Host, the HTP is notably reduced and induced $p_0$ is too large. The Chiral component is also poor compatible with the Host that resulted in reducing of $T_{SmC*}$ to 32°.

Example 46

TABLE 53

The composition of FLC-6-1 mixture.

| Components | Content of the component, mol. % |
|---|---|
| BPP-6 | 74.9 |
| 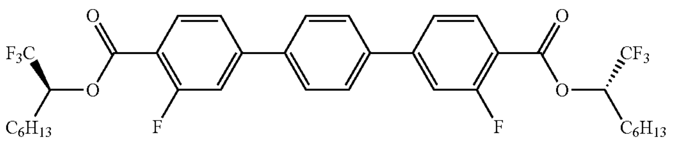 | 25.1 |

TABLE 54

Figure 7:
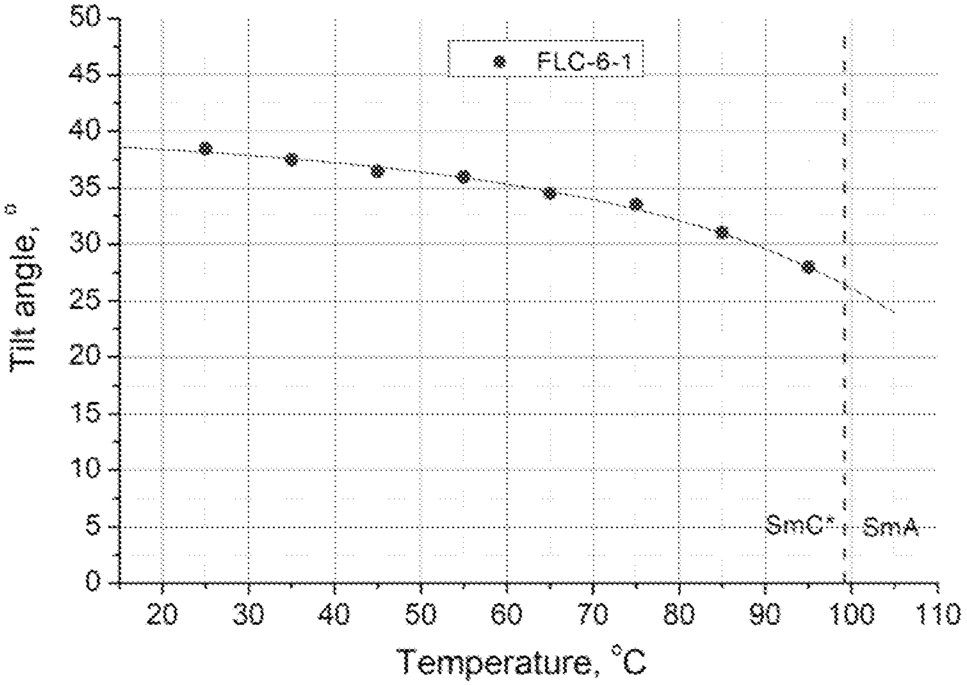
FIG. 7 shows temperature dependence of tilt angle for the mixture FLC-6-1. The vertical dotted line denoted the temperature of the phase transition SmC*→SmA in absence of external electric field.
Figure 8:
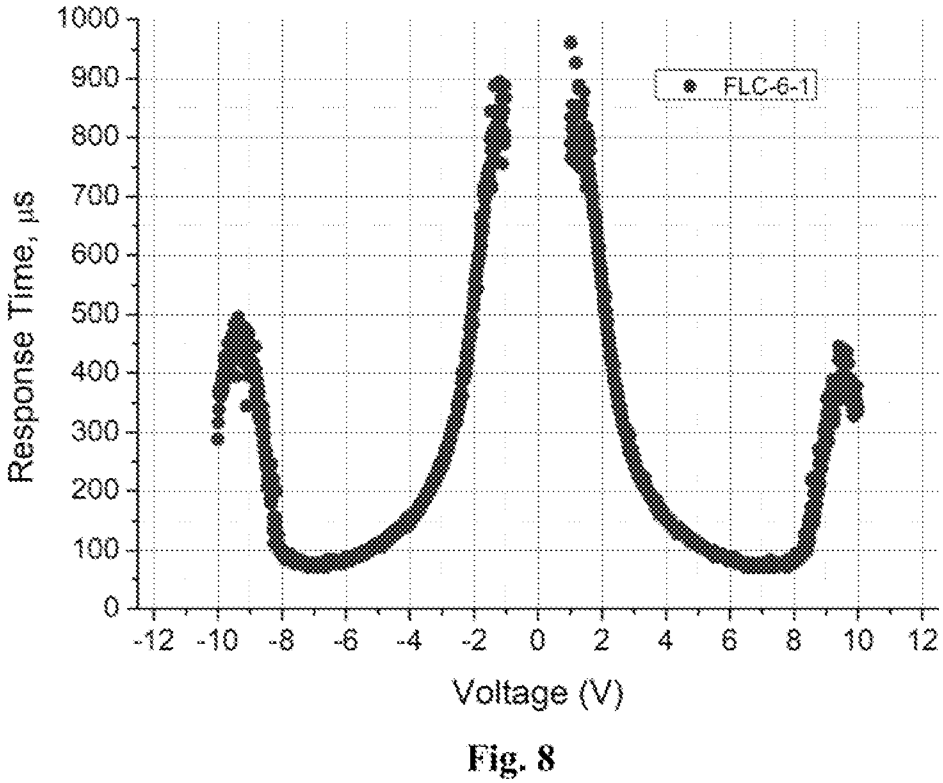
FIG. 8 shows dependence of response time, $\tau_{ON}$ at 90 Hz, for mixture FLC-6-1 at 25° C., cell gap 1.6 μm.

| The properties of FLC-6-1 mixture (at 25° C.). | |
|---|---|
| Phase transitions | $\mathrm{Cr} \xrightarrow{<16} \mathrm{SmC^*} \xleftarrow{97} \mathrm{SmA} \xleftarrow{108} \mathrm{Iso}$ |
| Helix pitch, $p_0$, nm | 91 |
| Tilt angle, θ, degree (FIG. 7) | 38.5 |
| Critical voltage of helix unwinding, $V_c$, V at 90 Hz | 12 |
| Spontaneous polarization, $P_S$, $nC/cm^2$ | 140 |
| Switching on time, $\tau_{ON}$, μs (FIG. 8) | 100 |

Example 47

TABLE 55

The composition of FLC-6-2 mixture.

| Components | Content of the component, mol. % |
|---|---|
| BPP-6 | 75.0 |
| 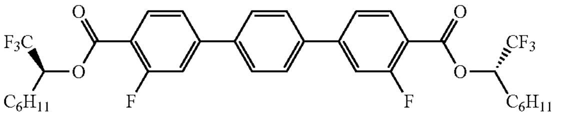 | 25.0 |

TABLE 56

| The properties of FLC-6-2 mixture (at 25° C.). | |
|---|---|
| Phase transitions | $\mathrm{Cr} \xrightarrow{13} \mathrm{SmC^*} \xleftarrow{99} \mathrm{SmA} \xleftarrow{106} \mathrm{N^*} \xleftarrow{114} \mathrm{Iso}$ |
| Helix pitch, $p_0$, nm | 112 |
| Tilt angle, θ, degree | 39.5 |
| Critical voltage of helix unwinding, $V_c$, V at 90 Hz | 8.2 |
| Spontaneous polarization, $P_S$, $nC/cm^2$ | 132 |
| Switching on time, $\tau_{ON}$, μs | 77 |

Example 48

TABLE 57

The composition of FLC-6-3 mixture.

| Components | Content of the component, mol. % |
|---|---|
| BPP-6 | 75.0 |
| 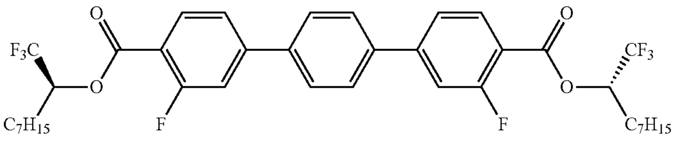 | 25.0 |

TABLE 58

| The properties of FLC-6-3 mixture (at 25° C.). | |
|---|---|
| Phase transitions | Cr —12→ SmC* ←97— SmA ←100— N* ←114— Iso |
| Helix pitch, $p_0$, nm | 91 |
| Tilt angle, θ, degree | 36 |
| Critical voltage of helix unwinding, $V_c$, V | 11.0 |
| Spontaneous polarization, $P_S$, nC/cm$^2$ | 141 |
| Switching on time, $\tau_{ON}$, μs | 85 |

The example shows effect of the length of terminal alkyl chain on helix pitch and on tilt angle, c.f. with Example 46

Example 49

TABLE 59

| The composition of FLC-6-4 mixture. | |
|---|---|
| Components | Content of the component, mol. % |
| BPP-6 | 83.2 |
| 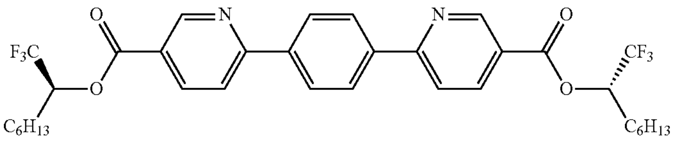 | 16.8 |

TABLE 60

| The properties of FLC-6-4 mixture (at 25° C.). | |
|---|---|
| Phase transitions | Cr —14→ SmC* ←98.9— SmA ←123.2— Iso |
| Helix pitch, $p_0$, nm | 123 |
| Tilt angle, θ, degree | 42.0 |
| Critical voltage of helix unwinding, $V_c$, V | 7.5 |
| Spontaneous polarization, $P_S$, nC/cm$^2$ | 94.5 |
| Switching on time, $\tau_{ON}$, μs | 54 |

Example 50 Comparative Example

TABLE 61

| The composition of FLC-6-5 mixture. | |
|---|---|
| Components | Content of the component, mol. % |
| BPP-6 | 74.9 |
| 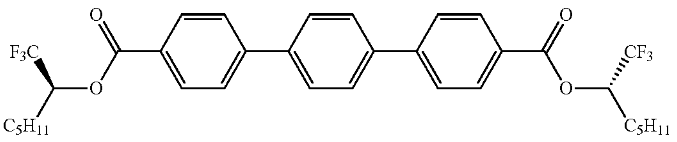 | 25.1 |

TABLE 62

| The properties of FLC-6-5 mixture (at 25° C.). | |
|---|---|
| Phase transitions | $Cr \xrightarrow{<20} SmC^* \xleftarrow{94} SmA \xleftarrow{111} N \xleftarrow{112.5} Iso$ |
| Helix pitch, $p_0$, nm | 125 |
| Tilt angle, θ, degree | 36.9 |
| Critical voltage of helix unwinding, $V_c$, V at 90 Hz | 6.5 |
| Spontaneous polarization, $P_S$, nC/cm$^2$ | 118.3 |
| Switching on time, $\tau_{ON}$, μs | 82 |

Comparative example showing results with known chiral component.

The Example shows effect of substitution in central core on tilt angle, c.f. with Example 46.

Example 51 Comparative Example

TABLE 63

The composition of FLC-6-6 mixture.

| Components | Content of the component, mol. % |
|---|---|
| BPP-6 | 74.9 |
| 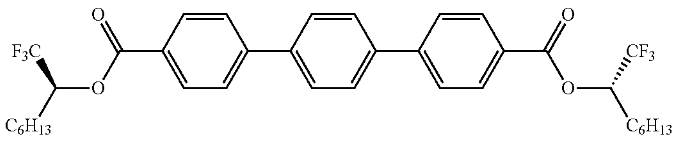 | 25.1 |

TABLE 64

| The properties of FLC-6-6 mixture (at 25° C.). | |
|---|---|
| Phase transitions | $Cr \xrightarrow{<16} SmC^* \xleftarrow{94} SmA \xleftarrow{110} Iso$ |
| Helix pitch, $p_0$, nm | 112 |
| Tilt angle, θ, degree | 36—below optimal value |
| Spontaneous polarization, $P_S$, nC/cm$^2$ | 106—close to lowest margin |
| Critical voltage of helix unwinding, $V_c$, V at 10 Hz | 9.7 |
| Switching on time, $\tau_{ON}$, μs | 150—close to upper margin |

Comparative example showing results with known chiral component. The Example shows effect of substitution in central core on θ, c.f. with Example 46.

Example 52

TABLE 65

| The composition of FLC-DFT-1 mixture. | |
|---|---|
| Components | Content of the component, mol. % |
| DFT | 75.2 |
| 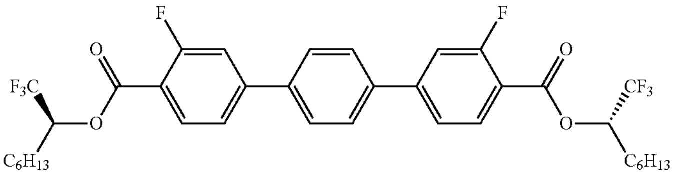 | 24.8 |

TABLE 66

| The properties of FLC-DFT-1 mixture (at 25° C.). | |
|---|---|
| Phase transitions | $Cr \xrightarrow{<15} SmC^* \xleftarrow{36} N^* \xleftarrow{95\text{-}91} Iso$ |
| Helix pitch, $p_0$, nm | 260—over the optimal value |

The example shows effect of the host. The chiral component is poor compatible with the host DFT, $T_{SmC^*}$ reduced to 36° C. and HTP reduces more than 2.5 times

Example 53

TABLE 67

| The composition of FLC-3DFT-1 mixture. | |
|---|---|
| Components | Content of the component, mol. % |
| BPP-3 | 56.3 |
| DFT | 18.8 |
| 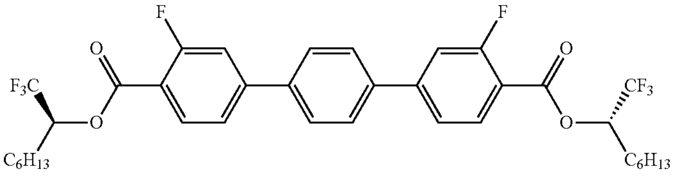 | 24.9 |

TABLE 68

| The properties of FLC-3DFT-1 mixture (at 25° C.). | |
|---|---|
| Phase transitions | $Cr \xrightarrow{3.5} SmC^* \xleftarrow{61} SmA \xleftarrow{75} N^* \xleftarrow{106.3} Iso$ |
| Tilt angle, θ, degree | 38.5 |
| Helix pitch, $p_0$, nm | 160—over the optimal value |

The example shows effect of the host.

The chiral component is poor compatible with the host DFT, $T_{SmC^*}$ reduced to 61° C. and HTP reduces more than 1.5 times Example 54

TABLE 69

| The composition of FLC-3DFT-2 mixture. | |
|---|---|
| Components | Content of the component, mol. % |
| BPP-3 | 44.9 |
| DFT | 30.0 |
| 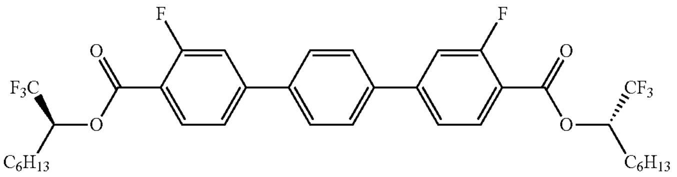 | 25.1 |

TABLE 70

| The properties of FLC-3DFT-2 mixture (at 25° C.). | |
|---|---|
| Tilt angle, 0, degree | 36.5—below optimal value |
| Helix pitch, $p_0$, nm | 212—over the optimal value |

The example shows effect of the host. The chiral component is poor compatible with the host DFT-$T_{SmC*}$ reduced to 55° C. and HTP reduces more than 2 times.

Example 55

TABLE 71

| The composition of FLC-DFT-2 mixture. | |
|---|---|
| Components | Content of the component, mol. % |
| DFT | 75.2 |
| 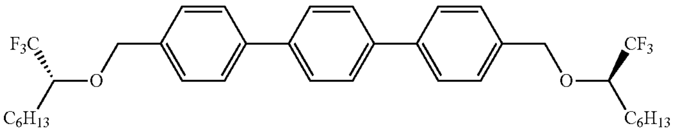 | 24.8 |

TABLE 72

| The properties of FLC-DFT-2 mixture (at 25° C.). | |
|---|---|
| Phase transitions | Cr —<15→ SmC* ←55— SmA ←69— N* ←78-75— Iso |
| Helix pitch, $p_0$, nm | 175—over the optimal value |

The example shows effect of the host. The chiral component is poor compatible with the host DFT, $T_{SmC*}$ reduced to 55° C. and HTP reduces more than 1.5 times. The mixture was unstable upon storage, part of the chiral components precipitates with time.

Summary of Examples

The key parameters of the FLC materials were optimized by varying the chemical structure of their components and carefully matching the length of both central core and terminal chains for chiral components and for the achiral host.

As it can be seen from Examples, the high enough spontaneous polarization and acceptably short helix pitch is observed for the mixtures where chiral component has the combination of highly polar groups (O and $CF_3$) at chiral centre with neighboring ester function. Chiral compounds possessing at chiral centre only polar ether function (—O— group) and low-polar $CH_3$ groups show considerably less twisting and polarization.

Long enough terminal alkyls in chiral components, which are longer than similar groups in the achiral host also favors to the high twisting and short helix pitch. However, the longer terminal alkyls reduce the tilt angle. And vice versa, when terminal alkyl chains are shorter, the HTP slightly decreases whereas tilt angle increases.

In all examples chiral compounds bearing polar atoms (lateral fluorine(s) or heterocyclic N atom) in the central core induced higher tilt angle than unsubstituted in core analogs. This effect is more pronounced when these polar groups are located rather at the ends of central core than in its middle.

Among suitable achiral hosts, biphenylpyrimidines (BPP) are preferable in comparison to laterally fluorinated terphenyls (DFT) or two-rings phenylpyrimidines (PP-7). Individually, the DFT host appears less compatible with proposed set of the chiral components than BPP. The DFT hosts notably reduce of upper limit of $T_{SmC*}$ phase, whereas this temperature only slightly changes in the mixtures of CC with BPPs, in some cases it even increases. However, DTF host can be used in a moderately low concentrations (~25 mol. %) with BPP in order reduce melting point of the mixture.

In the case of the PP7 Host, when it used individually with Chiral components, the HTP is not low and induced helix not enough tight to be used in DHFLC. In the mixtures PP7 with BPPs effect of melting point reduction became obvious only at high content of PP7, where its effect on HTP reduction is dominated.

INDUSTRIAL APPLICABILITY

The disclosed compound and liquid crystal composition may be used for electro-optical devices exploiting the DHFLC effect. This is applicable to industries such as display and photonic industries where the compound and liquid crystal composition can be used for LCD displays.

It will be apparent that various other modifications and adaptations of the invention will be apparent to the person skilled in the art after reading the foregoing disclosure without departing from the spirit and scope of the invention and it is intended that all such modifications and adaptations come within.

Key parameters of present invention (FLC) with that of current technologies.

TABLE 73

The comparison among FLC and Other NLCs Technologies

| Material | Response time | Pitch | Alignment | Contrast | Hysteresis |
|---|---|---|---|---|---|
| DHFLCs (Current invention) | ~100 us | «cell gap | Planar | ~800:1 | NO |
| SSFLC | ~50 us | > cell gap | Planar | ~100:1 | YES |
| Kerr Effect FLC | ~100 us | « cell gap | Vertical | ~1000:1 | NO |
| ESHFLC | ~50 us | ≤ cell gap | Planar | ~10000:1 | NO |

REFERENCES

[1] Sven T. Lagerwall, "Ferroelectric Liquid Crystal Displays and Devices", in Handbook of Liquid Crystals: 8 Volume Set, Second Edition. Edited by J. W. Goodby, P. J. Collings, T. Kato, C. Tschierske, H. F. Gleeson, and P. Raynes, 2014 Wiley-VCH Verlag gmbH & Co. KGaA. Published 2014 by Wiley-VCH Verlag gmbH & Co. KGaA., Volume 8. Applications of Liquid Crystals, Part I. Display Devices, pp 1-25.

[2] Coe-Sullivan, S., SID Symposium Digest of Technical Papers, Wiley Online Library 2016, pp. 239-240.

[3] Gardiner, D. J., Morris, S. M., Castles, F., Qasim, M. M., Kim, W. S., Choi, S. S., Park, H. J., Chung, I. J., Coles, H. J. (2011). Applied Physics Letters, 98, 263508.

[4] Lagerwall, S. T. (2004). Ferroelectric and antiferroelectric liquid crystals. Ferroelectrics, 301, 15.

[5] Xu, S., Ren, H., Wu, S. T. (2012). Optics Express, 20, 28518.

[6] Ming, Y., Chen, P. et al. (2017). Tailoring the photon spin via light-matter interaction in liquid-crystal-based twisting structures. Quantum Materials, 2(1), 6.

[7] Okaichi, N., Kawakita, M., Sasaki, H., Watanabe, H., Mishina, T. (2018). "High-quality direct-view display combining multiple integral 3D images" Journal of the Society for Information Display, 1-12, 2018.

[8] A. K. Srivastava, V. G. Chigrinov, H. S. Kwok, Ferroelectric liquid crystals: Excellent tool for modern displays and photonics, J. Soc. Inform. Display 23 (2015) 253-272.

[9] A. K. Srivastava, V. V. Vashchenko Ferroelectric liquid crystals and their application in modern displays and photonic devices, Boo chapter.

[10] V. Mikhailenko, A. Krivoshey, E. Pozhidaev, E. Popova, A. Fedoryako, S. Gamzaeva, V. Barbashov, A. K. Srivastava, H. S. Kwok, V. Vashchenko, The nano-scale pitch ferroelectric liquid crystal materials for modern display and photonic application employing highly effective chiral components: trifluoro-methylalkyl diesters of p-terphenyl-dicarboxylic acid, J. Mol. Liq. 281 (2019) 186-195.

The invention claimed is:

1. A ferroelectric liquid crystal (FLC) material for deformed helix FLC (DHFLC) electro-optical mode devices comprising at least two components and shows optimum electro-optical properties, wherein at least one FLC component is a chiral compound of Formula (I):

(I)

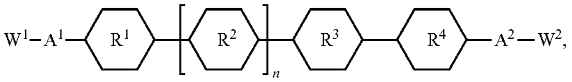

wherein:

n is 0 or 1;

$R^1$ and $R^4$ each independently 1,4-phenylene substituted with one or more substituents selected from the group consisting of halogen and methyl, pyrimidine-2,5-diyl or pyridine-2,5-diyl, wherein the pyrimidine-2,5-diyl and the pyridine-2,5-diyl are optionally substituted with one or more substituents selected from the group consisting of halogen and methyl;

$R^2$, and $R^3$ each independently are 1,4-phenylene, or pyrimidine-2,5-diyl, or pyridine-2,5-diyl, optionally substituted with one or more substituents selected from the group consisting of halogen and methyl;

$A^1$ and $A^2$ are independently absent, that has meaning the group $W^1$ or $W^2$ are directly attached to the rings $R^1$ or $R^4$, or selected from the group consisting of —O—, —S—, and ester; and $W^1$ and $W^2$ are independently chiral alkyl $C_mH_{2m+1}$ or alkenyl $C_mH_{2m}$, wherein m=4-14, and optionally wherein one or more hydrogens are independently replaced by F, Cl or cyano, and optionally one or more $CH_2$ are independently replaced with $CF_2$, O, or —CO— groups provided that two O atoms are not linked together, and wherein at least one FLC component is at least one achiral smectic C liquid crystal compound of Formula (II):

(II)

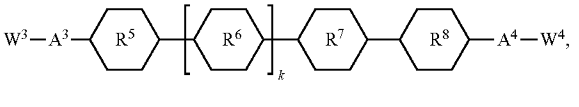

wherein:

$R^5$, $R^6$, $R^7$, and $R^8$ independently are 1,4-phenylene, or pyrimidine-2,5-diyl, or pyridine-2,5-diyl, optionally substituted with at least one substituent selected from the group consisting of halogen and methyl;

k is 0 or 1;

$A^3$ and $A^4$ are independently absent or selected from the group consisting of —O—, —S—, and ester; and $W^3$ and $W^4$ are independently alkyl $C_mH_{2m+1}$ or alkenyl $C_mH_{2m}$, wherein m=4-12, and optionally one or more hydrogens are independently replaced by F, furthermore, optionally one or more $CH_2$ are independently replaced with $CF_2$, O, or —CO— groups provided that two O atoms are not linked together, wherein the FLC material exhibits a tilt angle between 35-47 degrees and a spontaneous polarization larger than 100 nC/cm$^2$ at 25° C. and 1 atm.

2. The FLC material of claim 1, wherein $W^1$ and $W^2$ are independently substituted at their chiral center/centers with at least one moiety selected from the group consisting of F, Cl, trifluoromethyl, O, and cyano.

3. The FLC material of claim 1, wherein $W^1$ and $W^2$ are independently selected from the group consisting of:

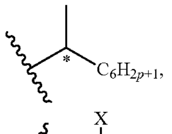
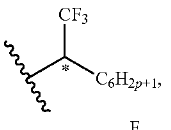
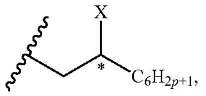
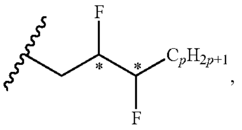
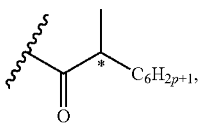
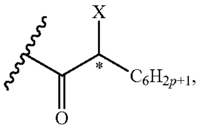
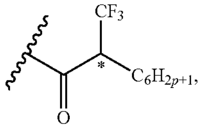
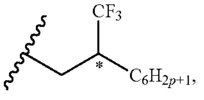
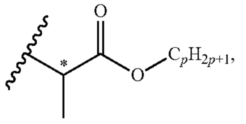
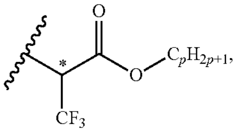
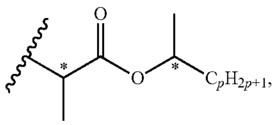
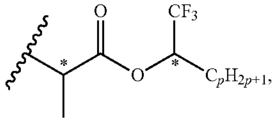

-continued

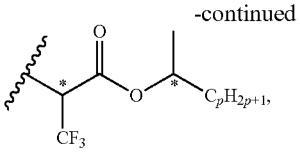
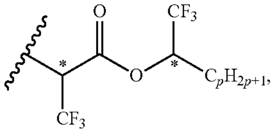
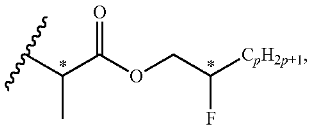
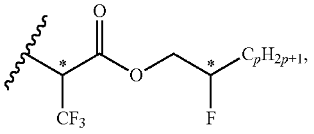
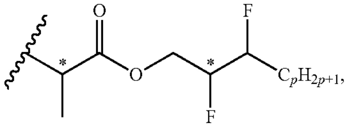 and
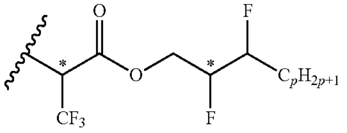

wherein

* for each instance represents a chiral center;

X is fluoro or chloro or cyano; and p is an integer in the range of 2 to 10.

4. The FLC material of claim 1, wherein the chiral compound of Formula (I) is of Formula (Ia):

(Ia)

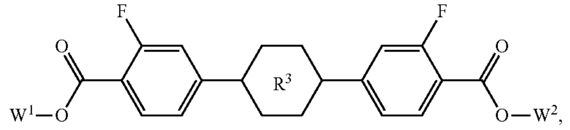

wherein $R^3$, $W^1$ and $W^2$ are as defined in claim 1.

5. The FLC material of claim 1, wherein the chiral compound of Formula (I) is of Formula (Ib):

(Ib)

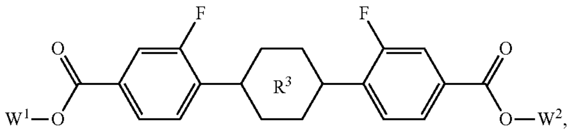

wherein $R^3$, $W^1$ and $W^2$ are as defined in claim 1.

6. The FLC material of claim 1, wherein the chiral compound of Formula (I) is of Formula (Ic):

(Ic)

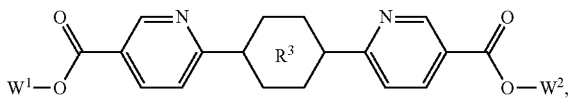, wherein $R^3$, $W^1$ and $W^2$ are as defined in claim 1.

7. The FLC material of claim 1, wherein the chiral compound of Formula (I) is of Formula (Id):

(Id)

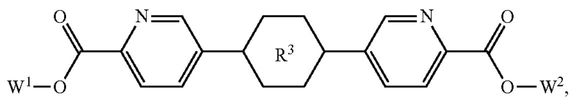, wherein $R^3$, $W^1$ and $W^2$ are as defined in claim 1.

8. The FLC material of claim 1, wherein the chiral compound of Formula (I) is of Formula (Ie):

(Ie)

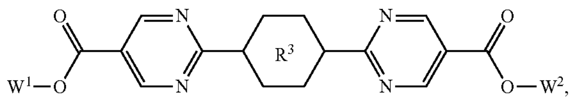, wherein $R^3$, $W^1$ and $W^2$ are as defined in claim 1.

9. The FLC material of claim 1, wherein the chiral compound of Formula (I) is of Formula (If):

(If)

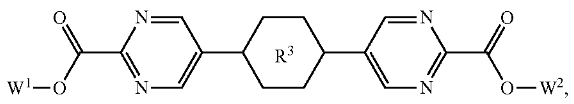, wherein $R^3$, $W^1$ and $W^2$ are as defined in claim 1.

10. The FLC material of claim 1, wherein the chiral compound of Formula (I) is selected from the group consisting of:

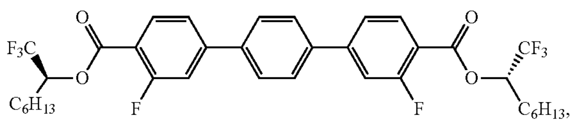,

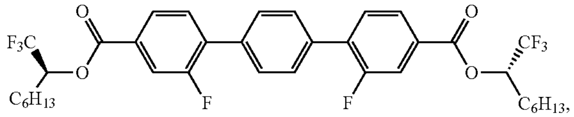,

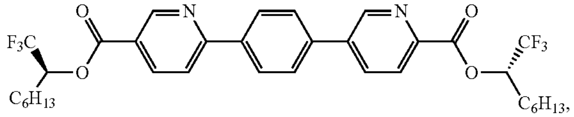,

-continued

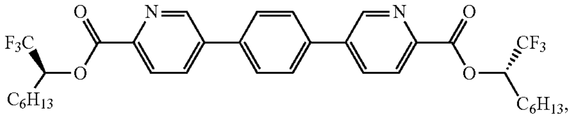,

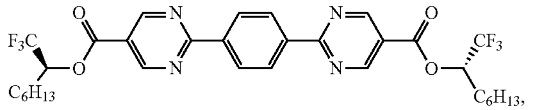, and

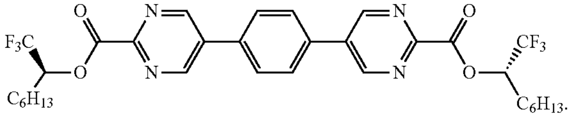.

11. The FLC material of claim 1, wherein the at least one achiral smectic C liquid crystal compound of Formula (II) is of the Formula (IIa):

(IIa)

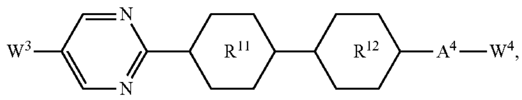, wherein $R^{11}$ and $R^{12}$ independently are 1,4-phenylene, or pyrimidine-2,5-diyl, or pyridine-2,5-diyl, optionally substituted with at least one substituent selected from the group consisting of halogen and methyl; and $W^3$, $A^4$ and $W^4$ are as defined in claim 1.

12. The FLC material of claim 1, wherein the at least one achiral smectic C liquid crystal compound of Formula (II) is selected from the group consisting of:

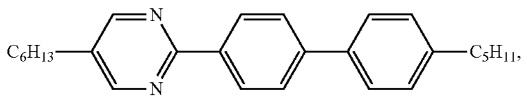,

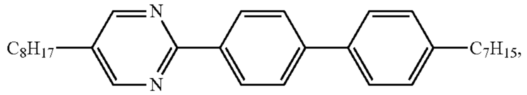,

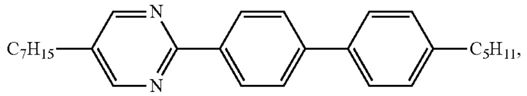,

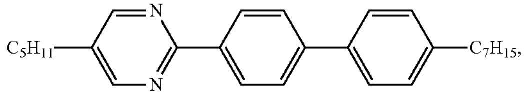,

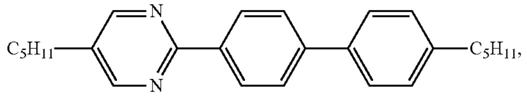,

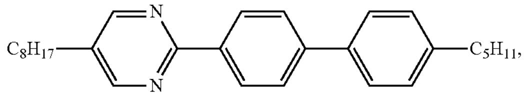,

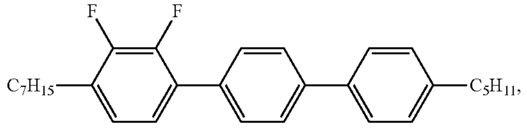,

-continued

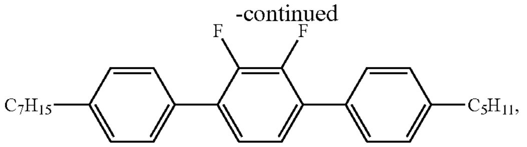

and

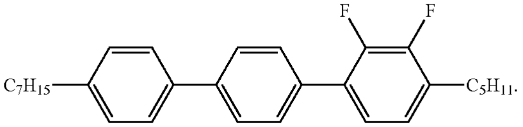

13. The FLC material of claim 1, wherein an average length of $W^1$ and $W^2$ is larger than an average length of $W^3$ and $W^4$.

14. The FLC material of claim 1, wherein an average length of $W^1$ and $W^2$ is equal to an average length of $W^3$ and $W^4$ or larger than that by up to 2-times.

15. The FLC material of claim 1, wherein the total number of rings in $R^1$, $R^2$, $R^3$ and $R^4$ is equal to the total numbers of rings in $R^5$, $R^6$, $R^7$ and $R^8$.

16. The FLC material of claim 1, wherein the chiral compound of Formula (I) and the at least one achiral smectic C liquid crystal compound of Formula (II) have a molar ratio in the range of 10:90 to 40:60.

17. The FLC material of claim 1, wherein the chiral compound of Formula (I) has a concentration of less than 20 molar % based on the total number of moles of the FLC material.

* * * * *